United States Patent
Anderson et al.

(10) Patent No.: US 12,488,319 B2
(45) Date of Patent: Dec. 2, 2025

(54) WASTE MANAGEMENT DEVICE

(71) Applicant: RecycleSmart Solutions Inc., Richmond (CA)

(72) Inventors: Carl Michael Anderson, Richmond (CA); Colin Edward Bell, Richmond (CA)

(73) Assignee: RecycleSmart Solutions Inc., Richmond (CA)

( * ) Notice: Subject to any disclaimer, the term of this patent is extended or adjusted under 35 U.S.C. 154(b) by 433 days.

(21) Appl. No.: 17/485,936

(22) Filed: Sep. 27, 2021

(65) Prior Publication Data

US 2022/0101279 A1    Mar. 31, 2022

Related U.S. Application Data

(60) Provisional application No. 63/083,152, filed on Sep. 25, 2020.

(51) Int. Cl.
   *G06Q 10/00* (2023.01)
   *B65F 1/02* (2006.01)
   (Continued)

(52) U.S. Cl.
   CPC .............. *G06Q 10/30* (2013.01); *B65F 1/02* (2013.01); *G01F 23/802* (2022.01); *G01F 25/20* (2022.01);
   (Continued)

(58) Field of Classification Search
   CPC ....... G06Q 10/30; G01F 23/802; G01F 25/20; B65G 1/02; H04B 1/02; B65F 2210/128;
   (Continued)

(56) References Cited

U.S. PATENT DOCUMENTS 8,009,513 B2 *   8/2011   LaWhite .............. G10K 11/346
                                                              367/90
9,352,887 B2     5/2016   Poss et al.
(Continued)

FOREIGN PATENT DOCUMENTS

EP      3032640 A1    6/2016
EP      3138790 A1    3/2017
(Continued)

OTHER PUBLICATIONS

A.T Anagnostopoulos, et al., "Top—k Query Based Dynamic Scheduling for IoT-enabled Smart City Waste Collection", 2015 16th IEEE International Conference on Mobile Data Management, Pittsburgh, PA, USA, 2015, pp. 50-55, doi: 10.1109/MDM.2015.25. (Year: 2015).

(Continued)

*Primary Examiner* — Stephen D Meier
*Assistant Examiner* — Quang X Nguyen
(74) *Attorney, Agent, or Firm* — Own Innovation; James W. Hinton; Sanjeevan Shivakumar

(57) ABSTRACT

Disclosed is a waste management device including a housing attached to a waste bin. A plurality of sensors are configured to sense contents of the waste bin. The plurality of sensors are encased by the housing. A processor is electrically coupled to the plurality of sensors. The processor is configured to collect sensory information related to the contents of the waste bin from the plurality of sensors. The processor is encased by the housing. A wireless transmitter is electrically coupled to the processor. The wireless transmitter is configured to send the sensory information to a server, wherein the wireless transmitter is encased by the housing.

18 Claims, 35 Drawing Sheets

(51) Int. Cl.
  *G01F 23/00* (2022.01)
  *G01F 23/80* (2022.01)
  *G01F 25/00* (2022.01)
  *G01F 25/20* (2022.01)
  *G06Q 10/30* (2023.01)
  *H04B 1/02* (2006.01)

(52) U.S. Cl.
  CPC .......... *H04B 1/02* (2013.01); *B65F 2210/128* (2013.01); *B65F 2210/1443* (2013.01); *B65F 2210/168* (2013.01); *B65F 2210/20* (2013.01)

(58) Field of Classification Search
  CPC ........ B65F 2210/1443; B65F 2210/168; B65F 2210/20
  See application file for complete search history.

(56) References Cited

U.S. PATENT DOCUMENTS

| | | |
|---|---|---|
| 2008/0061222 A1 | 3/2008 | Powers et al. |
| 2009/0126473 A1 | 5/2009 | Porat et al. |
| 2012/0243093 A1 | 9/2012 | Tonar et al. |
| 2014/0103479 A1* | 4/2014 | Luc .......... A61L 9/12 257/435 |
| 2014/0278630 A1 | 9/2014 | Gates et al. |
| 2014/0379588 A1 | 12/2014 | Gates et al. |
| 2015/0036037 A1 | 2/2015 | Reed |
| 2015/0307273 A1 | 10/2015 | Lyman |
| 2015/0323366 A1 | 11/2015 | Kekalainen et al. |
| 2015/0324760 A1 | 11/2015 | Borowski et al. |
| 2015/0339914 A1* | 11/2015 | Kekalainen .......... G01D 11/245 340/506 |
| 2016/0321619 A1* | 11/2016 | Inan .................. H04L 69/40 |
| 2016/0354990 A1 | 12/2016 | Skocypec et al. |
| 2017/0090447 A1* | 3/2017 | Skocypec .......... B65F 1/08 |
| 2019/0311333 A1 | 10/2019 | Kekalainen et al. |
| 2020/0081120 A1 | 3/2020 | Soldner et al. |
| 2020/0082354 A1 | 3/2020 | Kurani |
| 2020/0191580 A1 | 6/2020 | Christensen et al. |
| 2020/0213434 A1* | 7/2020 | Samkov .......... H04M 1/04 |
| 2021/0004911 A1 | 1/2021 | Poss et al. |

FOREIGN PATENT DOCUMENTS

| | | |
|---|---|---|
| EP | 2803953 B1 | 9/2021 |
| WO | 2014079586 A1 | 5/2014 |
| WO | 2014114469 A2 | 7/2014 |
| WO | 2015094140 A1 | 6/2015 |
| WO | 2015137997 A1 | 9/2015 |
| WO | 2020060421 A1 | 3/2020 |

OTHER PUBLICATIONS

World Intellectual Property Organization, International Search Report and Written Opinion for PCT/2021/051338, Dec. 29, 2021.
World Intellectual Property Organization, International Search Report and Written Opinion for PCT/CA2021/051339, Dec. 15, 2021.
USPTO, Office Action for U.S. Appl. No. 17/485,945, Apr. 16, 2024.
USPTO, Office Action for U.S. Appl. No. 17/485,945, Sep. 23, 2024.
European Patent Office, Extended European Search Report for EP Patent App. No. 21870651.3, Sep. 20, 2024.
European Patent Office, Extended European Search Report for EP Patent App. No. 21870652.1, Sep. 20, 2024.

* cited by examiner

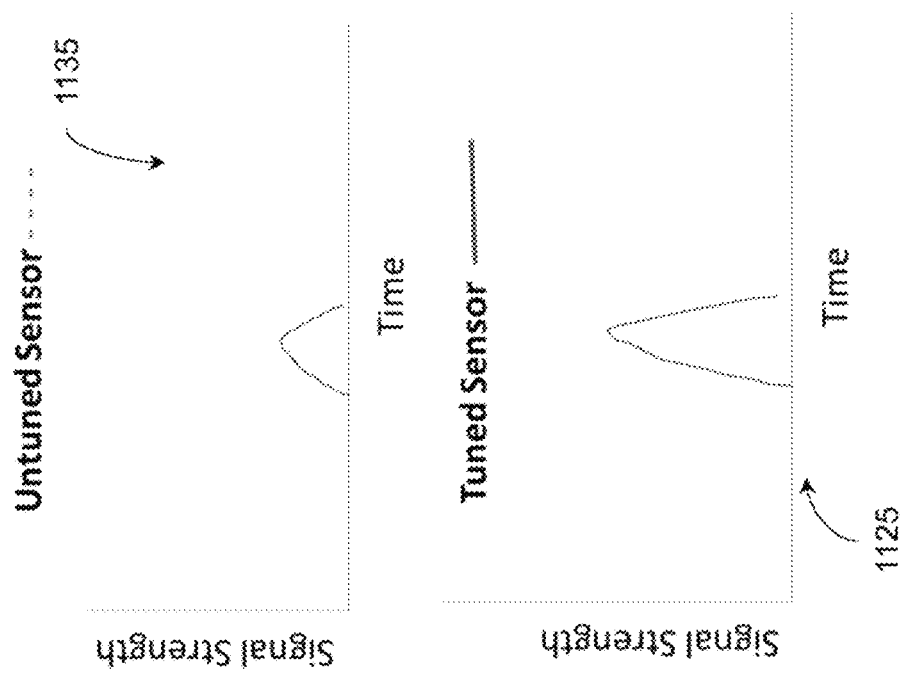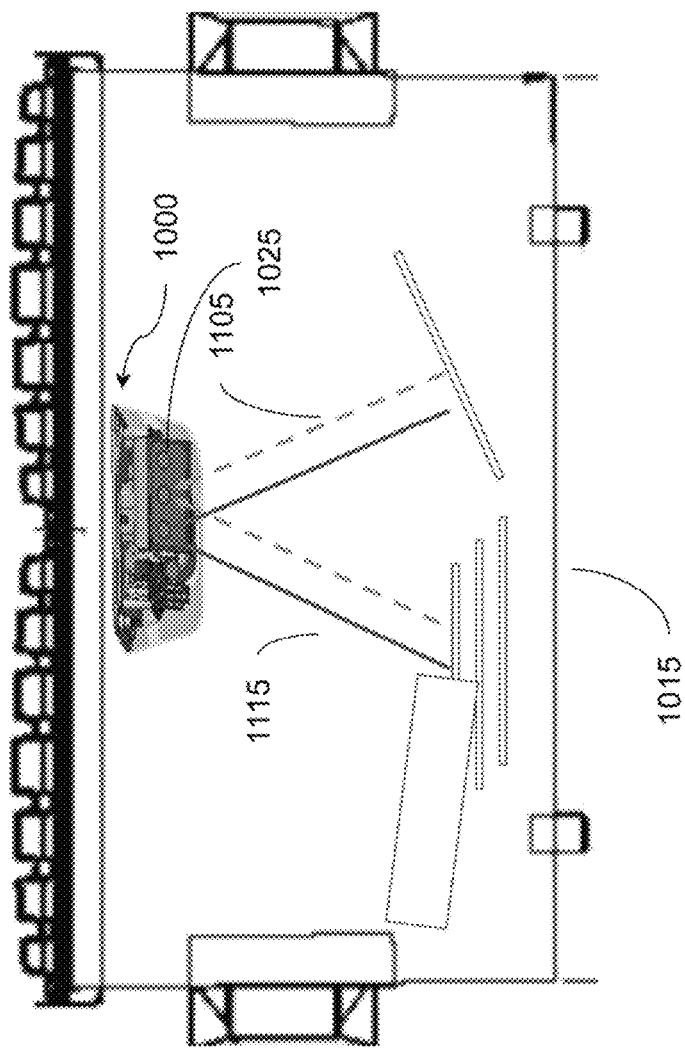
Figure 8

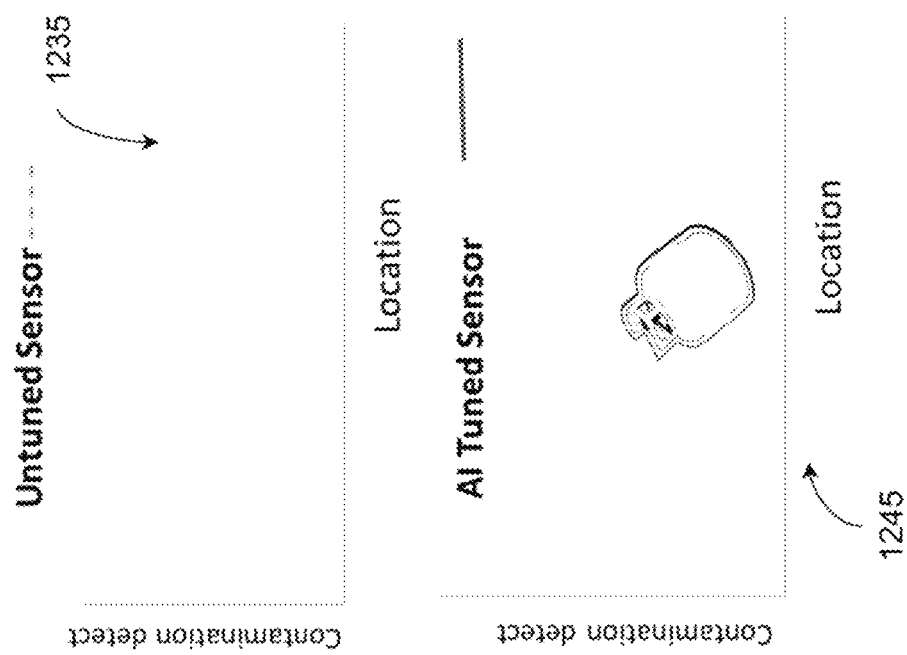
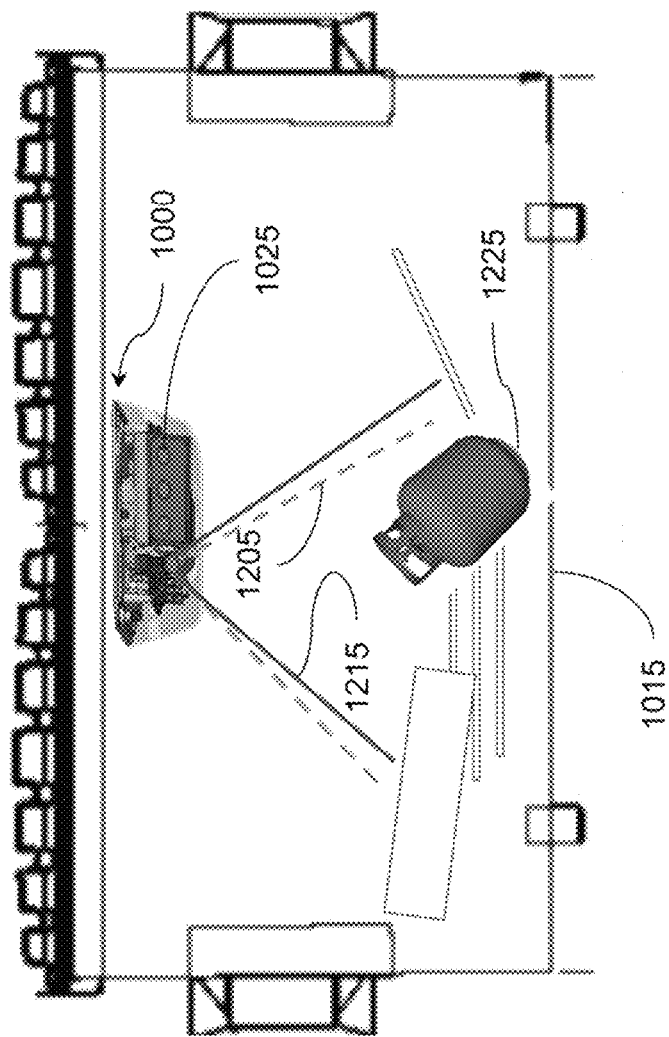
Figure 9

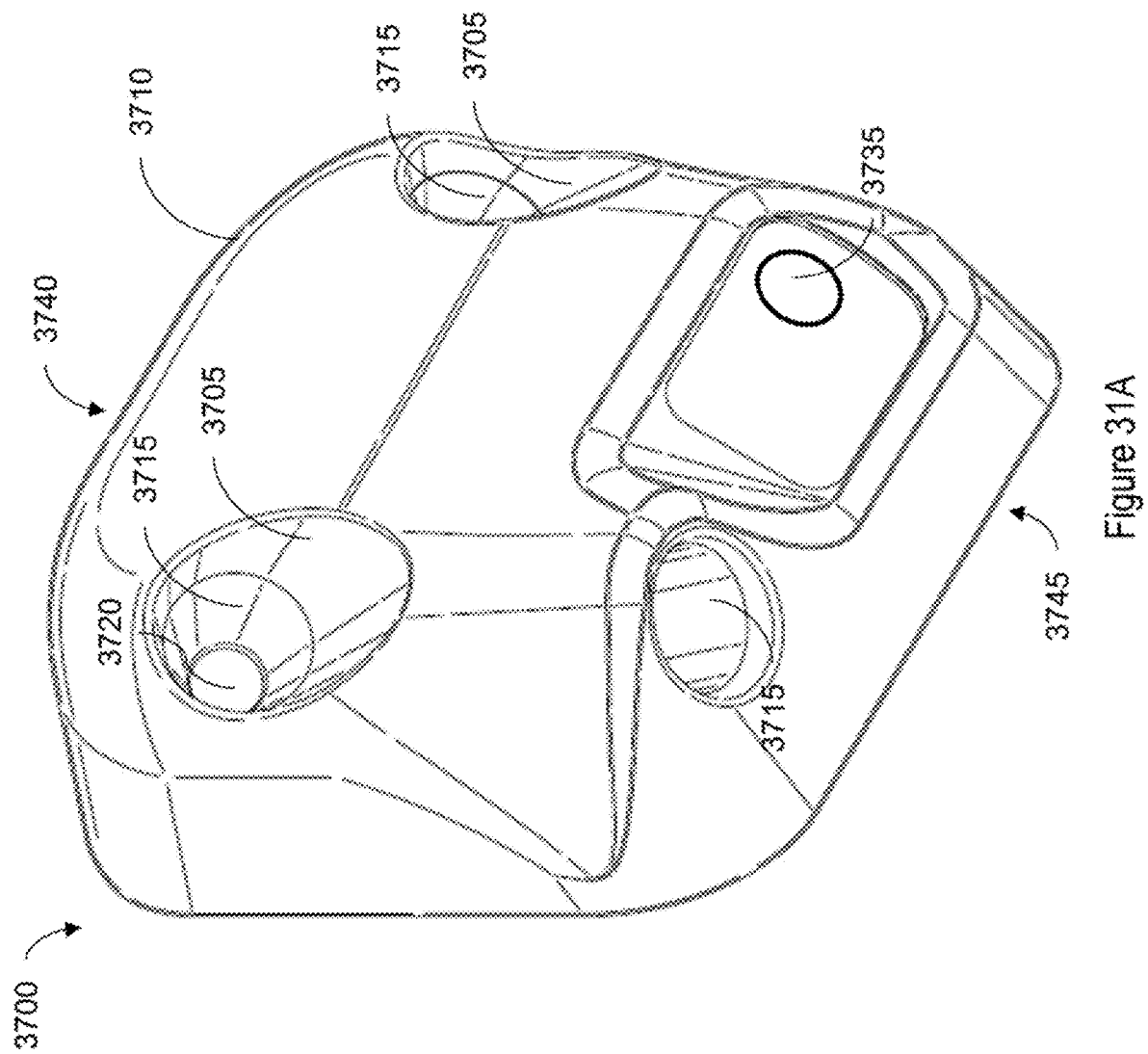

WASTE MANAGEMENT DEVICE

TECHNICAL FIELD

The embodiments disclosed herein relate to waste management, and, in particular to systems, apparatus, and/or methods for waste management.

INTRODUCTION

Current waste management firms have not adopted technology and typically work on a fixed pickup schedule with fixed daily routes. This is the baseline or existing current condition with no route optimization or remote bin "fill level" indicators to produce optimal routing and bin overflow protection. Instead the number of pickups (bin emptying) per week is adjusted to ensure the bins do not overflow resulting in bins being picked up when empty or only marginally filled. This is extremely inefficient leading to commercial waste and recycling collection bins being inherently over-serviced while waste generation rates continue to increase and green house gases (GHG) increase.

A technical problem to be solved is to provide a device with a plurality of sensors and a computer system that analyzes sensory information from the device to remotely detect the bin fill levels in an effort to provide some efficiencies to the industry. To date the sensors provided have not met with industry uptake due to a lack accuracy in the reported bin fill levels, poor cellular connections leading to late and inconsistent bin level reports or plain failures to report, easily blocked sensors and limited resistance to the harsh environment in the waste environment.

In addition, recycling contamination in the industry is an ongoing issue that has not been solved. This is a critically important issue, especially as countries refuse the import of contaminated recyclable materials. Detecting the source of contamination is usually a time-intensive and challenging process that is conducted typically by manual visual inspection. Contaminated recyclables can reduce the entire collection value to zero and frequently result in landfill disposal of not just the material collected in a bin but the entire truck load of material. The industry needs a way of automating contamination detection as well as improving efficiencies to reduce landfill, GHG emissions and costs. Accordingly, another technical problem to be solved is to provide a sensor and computer technology to be able to detect contamination of recyclable materials.

Current sensors, systems, and methods have not been met with industry uptake due to a lack accuracy in the reported bin fill levels which leads to bins pickup being mis-timed— either wasting fuel and time if picked up early before it was full or resulting in waste overflows if it is picked up late after it was already full for some time.

Current sensors, systems, and methods also possess poor cellular connections leading to reporting timing inconsistencies or plain failures to report on bin levels resulting in manually scheduled bin pickups of unknown fill level or those that needed to be picked up being missed and overflowing. Optimized route pickup which provides the greatest return on investment and least equipment/personnel utilized only works if you can verify what bins need pickup before the truck leaves on a pickup route.

Further, sensors using optical methodologies (e.g., cameras, light based time of flight) are subject to cover glass occlusion from water entering the bin when it rains and mixing with bin contents or wet waste material from moist waste. This occlusion occurs when the coverglass gets coated with an opaque material that prevents clear optical transmission. Once blocked or occluded the sensors are incapable of providing any information on fill levels even if a human reviews the result. The sensors have to be cleaned at the site before they can be returned to operational status.

Current sensors, systems, and methods also possess limited resistance to the harsh conditions in external waste bins, such as ambient temperatures of −40C to +70 C or more inside the bins, freezing and thawing transitions, and the waste bin pickup methodology used such as front load bins being repeatedly slammed against metal rails to ensure the bin is completely emptied.

Accordingly, there is a need for new waste management devices, systems, and methods to determine bin fill levels, and system efficiencies that improve operations with significant cost benefits, which are not possible to date.

SUMMARY

Provided is a waste management device including a housing attached to a waste bin. The waste management device includes a plurality of sensors configured to sense contents of the waste bin. The plurality of sensors are encased by the housing. The waste management device includes a processor electrically coupled to the plurality of sensors. The processor is configured to collect sensory information related to the contents of the waste bin from the plurality of sensors wherein the processor is encased by the housing. The waste management device includes a wireless transmitter electrically coupled to the processor. The wireless transmitter configured to send the sensory information to a server, wherein the wireless transmitter is encased by the housing.

The waste management device may provide that the processor is configured to determine a fill level of the waste bin based on the sensory information from at least two sensors.

The waste management device may provide that the server is configured to determine a fill level of the waste bin based on the sensory information from at least two sensors.

The waste management device may include an accelerometer configured to detect the 3 dimensional tilt of at least one sensor.

The waste management device may provide that the plurality of sensors comprises at least two different types of sensors.

The waste management may provide that the fill level of the waste bin is determined based on the sensory information of at least two different types of sensors.

The waste management device may provide that the plurality of sensors comprises at least one of an ultrasonic sensor, a camera sensor, a time of flight sensor, a radar sensor, a lidar sensor, and a multispectral camera sensor.

The waste management device may provide that the plurality of sensors includes at least three or more sensors of the same type.

The waste management device may provide that the wireless transmitter includes at least one of a cellular modem and a wifi modem.

The waste management device may include a controller, wherein the controller is configured to reconfigure the plurality of sensors based on an input from the server.

The waste management device may provide that the plurality of sensors are configured to be oriented in different directions.

The waste management device may provide that at least one sensor of the plurality of sensors is configured to be oriented in a direction to confirm the distance to the bottom of the waste bin.

The waste management device may provide that the housing further comprises a protective lens configured to prevent occlusion of at least one sensor.

Provided is a method of managing waste including attaching a plurality of sensors to a waste bin. The method of managing waste includes configuring the plurality of sensors to sense the contents of the waste bin. The method of managing waste includes collecting sensory information from the plurality of sensors. The method of managing waste includes determining a fill level of the waste bin based on the sensory information of at least two sensors.

The method of managing waste may include collecting waste from the waste bin when the fill level is above a threshold fill level.

The method of managing waste may include determining the fill based on sensory information from at least two sensors of different types. The fill level is determined after cross-validation with the at least two different types of sensors.

The method of managing waste may provide that a distance measurement is derived from the sensory information to determine the fill level of the waste bin.

The method of managing waste may provide that the sensory information of at least two sensors is used to improve the accuracy of the fill level of the waste bin.

Provided is a waste management device including a housing attached to a waste bin. The waste management device includes at least three sensors configured to sense contents of a waste bin, wherein the at least three sensors are encased by the housing. The waste management device includes a processor electrically coupled to the sensors. The processor is configured to collect sensory information from the sensors The processors is encased by the housing. The waste management device includes a wireless transmitter electrically coupled to the processor. The wireless transmitter is configured to send the sensory information to a server.

The waste management device may provide that the processor is configured to determine a fill level of the waste bin based on the sensory information from the sensors.

The waste management device may provide that the at least three sensors comprises at least two different types of sensors.

The waste management device may provide that the fill level of the waste bin is determined based on the sensory information of at least two different types of sensors.

A waste management device, system, and method is provided which allows for determining waste bin fill levels based on sensory information obtained from a plurality of sensors. The system allows for cloud-based tracking of all waste and recycling bins providing analysis tools, operations dashboards, routing to filled bins and history for the operation. A key feature is the ability to directly interact with those bins using custom or third party onsite sensors to indicate bin levels and take photos of contents throughout the filling cycle.

The waste management devices, systems, and methods provide a technical solution to a sustainability problem in waste management by allowing for intelligent control of the pickup of waste bins. The devices, systems, and methods may allow for bins to only be picked up when they are significantly full as opposed to the current methods which pickup based on a pre-determined route and what day of the week it is, independent of how much (if any) waste is in the bin. The waste management devices, systems, and methods provided herein may use cloud computing analytics, specialized wireless sensors on the bins, and system wide dashboards combined with routing which allows waste bin data to be tracked, displayed and if requested automatically routed for pickup driving new levels of efficiency.

The waste management devices, systems, and methods may allow for more information on bin fill levels and information on fill contamination which will drive efficiencies in operations, and improve returns on recyclables by identifying contamination in bins as well as those ready for pickup optimization.

The waste management devices, systems, and methods may provide for accurate fill levels that can be cross verified, specialized cellular technology based on the fixed, not mobile, use case to ensure strong reliable connections and consistent reporting, unique optical cleaning technology for long lasting optical sensor use, a custom multispectral camera for contamination identification and packaging built for the harsh environment. These features will provide waste management firms the key features that allow large industry uptake:

The waste management devices, systems, and methods may provide for large industry uptake by providing an accurate view of what the fill level of the waste bin is or will be—allowing just in time bin pickup scheduling. It may also provide doubly verifiable pickup events and timing for each waste bin. Allowing an accurate routing for waste vehicles before they depart on a route may also be provided by incorporating solid cellular data connections and with that consistent network access and data reporting timing.

The waste management devices, systems, and methods may require less sensor servicing typically required by current optical sensors, providing longer valid use cycles, reducing costs, and helping provide accurate routing for vehicles before they depart on a route. A longer sensor lifetime provides lower total cost of ownership and wider deployment.

The waste management devices, systems, and methods may provide contamination detection in both waste and recycling bins, allowing for notification to the customer of problem bins, correction of bin contamination and preventing contamination of the full vehicle load which would force the waste to be sent instead to a landfill.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 8 is an embodiment of a waste management device attached to the top of a waste bin with the plurality of sensors including a sensor that is tuned and another sensor that is untuned, in accordance with an embodiment;

FIG. 9 is a waste management device attached to the top of a waste bin with the plurality of sensors including a sensor that is tuned by artificial intelligence (AI) or machine learning techniques and another sensor that is untuned, in accordance with an embodiment;

FIG. 31A is a perspective front view of a waste management device is shown, in accordance with an embodiment;

DETAILED DESCRIPTION

Figure 1A:
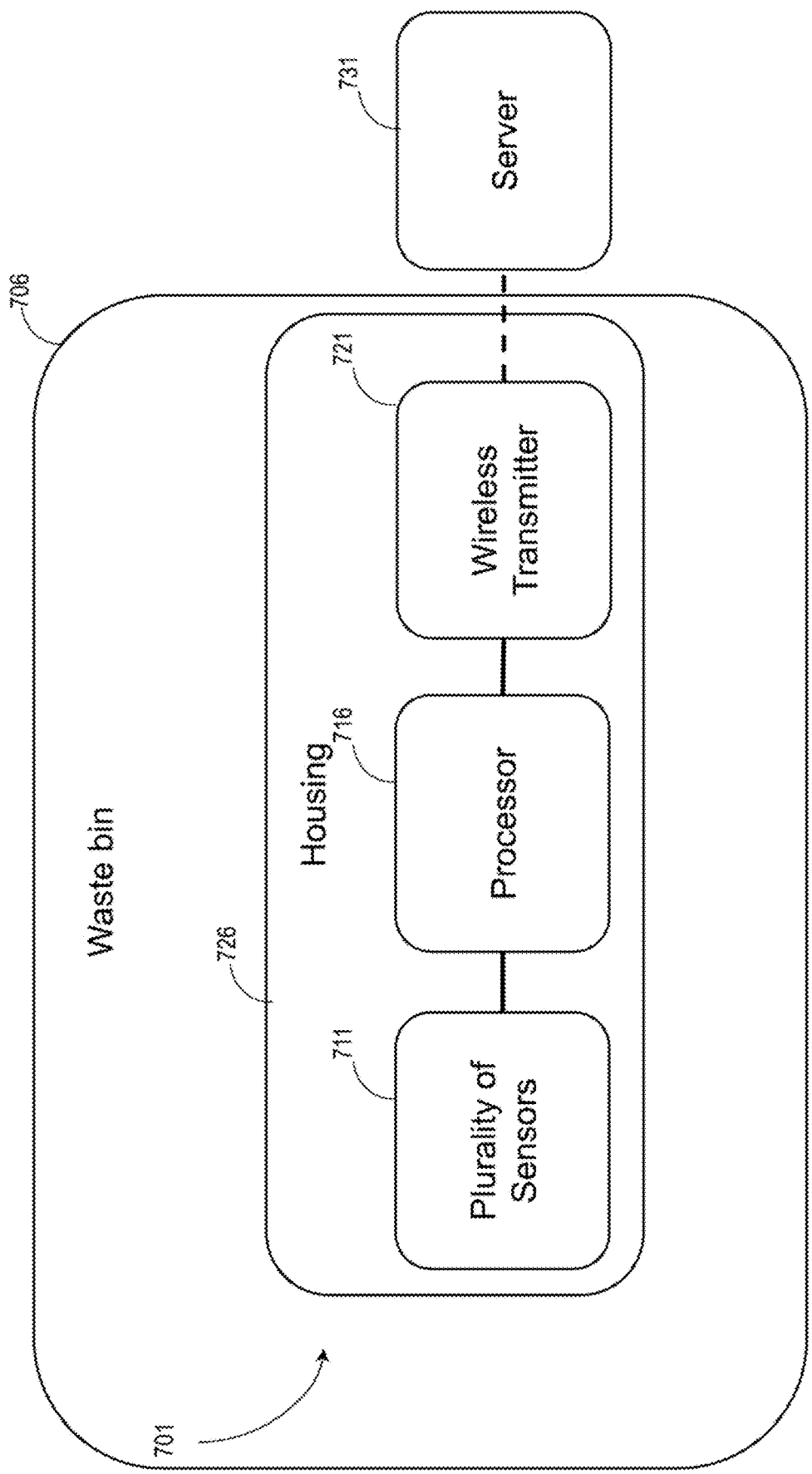
FIG. 1A is a block diagram a waste management device, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The term "contamination" refers to the presence of a substance in a waste bin that prevents the intended disposal of the contents of the waste bin. For example, contamination may include the presence of non-recyclable materials in a waste bin intended for recycling waste. Contamination of a waste bin may also include presence of a elements which cannot be disposed in a landfill, such as propane tanks, inside a waste bin that is intended for disposal in a landfill. Contamination may also refer to the presence of non-biodegradable elements inside a waste bin intended for organic waste.

The term "controller" as used herein refers to a computer component adapted to control a system to achieve certain desired goals and objectives. For example, this may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term "sensor" refers, without limitation, to the component or region of a device by which is configured to detect the presence or absence of a measurable parameter. For example, the sensor may be a light sensor configured to detect the presence or absence of light, or a distance between objects detected using light reflected off one or both objects. The sensor may also be an ultrasonic sensor as a component in an ultrasonic transducer which includes both a unit of an ultrasonic actuator and the ultrasonic sensor, serving as a transmitter and a receiver, respectively, together in a pulse-echo ranging measurement method using ultrasonic waves.

The term "sensory information" refers to information, data, or measurements collected by a sensor. For example, sensory information from an ultrasonic sensor may include a distance measurement based on a pulse-echo randing measurement method using ultrasonic waves. The sensory information may also be a distance measurement from a time of flight sensor by measuring the round trip time of an artificial light signal provided by a laser or an LED. Without limitation, sensory information may also include a video feed provided by a camera sensor or multispectral camera sensor.

The term "waste bin" refers to a container for temporarily storing waste. The waste bin may be made out of metal, plastic, or any suitable material for temporarily storing waste. The waste stored in a waste bin can be, without limitation, garbage waste, recycling waste, organic waste, or chemical waste. The term "waste bin" may be used interchangeably with, without limitation, waste container, garbage bin, recycling bin, compost bin, or dust bin.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Referring to FIG. 1A, a block diagram of an embodiment of a waste management device 701 is shown. The waste management device 701 includes a housing 726 attached to a waste bin 706.

The waste management device 701 also includes a plurality of sensors 711 configured to sense contents of the waste bin. The plurality of sensors 711 are encased by the housing 726. The plurality of sensors may also include at least three sensors of the same type.

The waste management device 701 includes a processor 716 electrically coupled to the plurality of sensors 711. The processor 716 is configured to collect sensory information related to the contents of the waste bin from the plurality of sensors. The processor 711 is encased by the housing 726.

The waste management device 701 includes a wireless transmitter 721 electrically coupled to the processor 716. The wireless transmitter 721 is configured to send the sensory information to a server 731. The wireless transmitter 721 is encased by the housing 726.

Figure 1B:
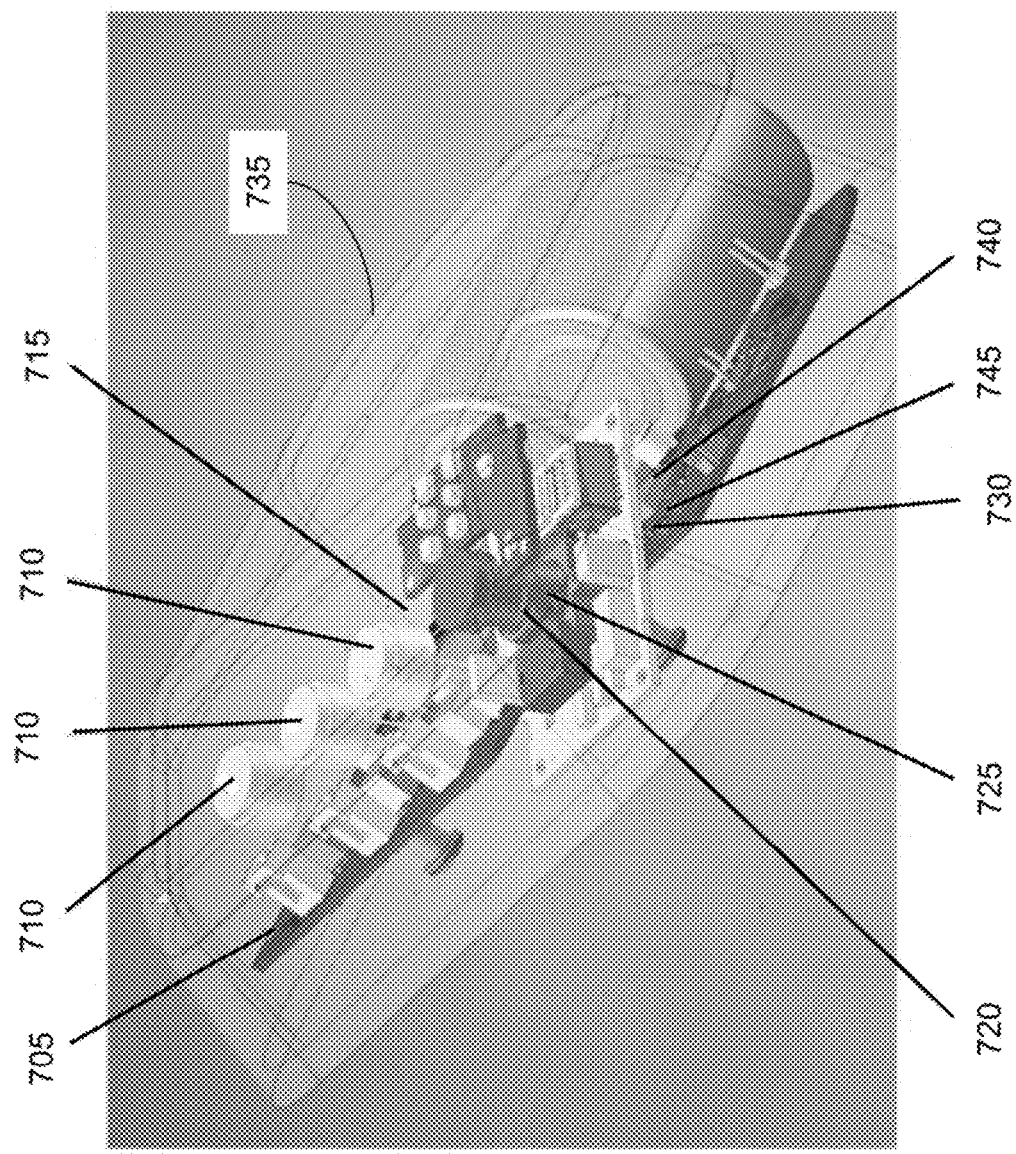
FIG. 1B is a waste management device, in accordance with an embodiment.

Referring to FIG. 1B, an embodiment of the waste management device 700 is shown. The waste management device 700 includes a housing 735. The housing 735 is configured to be attached to a waste bin. The housing 735 may include one or more raised mounting points (not shown) on an external surface of the housing 375 for attaching the waste management device 700 to a waste bin such that the housing 375 contacts the waste bin at the one or more mounting points.

FIG. 1B shows the housing 735 as transparent to provide a view of the internals of the waste management device 700. The waste management device also includes a plurality of sensors configured to sense contents of the waste bin, the sensors are encased by the housing. The sensors include three ultrasonic sensors 710, a magnetic sensor 705, an accelerometer sensor 715, a multispectral camera sensor 720, a camera sensor 725, a temperature sensor 730, and a location sensor 745 such as a GPS. According to some embodiments, the temperature sensor 730 may be disposed on an external surface of the housing 735 to measuring ambient temperature changes indicative of a fire in the waste bin.

The waste management device includes a processor 716 configured to collect sensory information related to the contents of the waste bin from the plurality of sensors 711.

The waste management device also includes a wireless transmitter 740 configured to send the sensory information to a server 731. The wireless transmitter 740 includes a cellular modem.

In an embodiment, the waste management device 700 includes a processor 716 and a camera subsystem. The camera subsystem includes the camera board and it's LED flash board which are connected together and fit into the mechanical enclosure with the master board and system batteries.

The processor 716 can have a variety of inputs. The processor is electrically coupled to a plurality of sensors which include, but are not limited to, a first ultrasonic sensor, a second ultrasonic sensor, a third ultrasonic sensor, an accelerometer, optionally a 3-axis accelerometer sensor 715, a Global Positioning System (GPS) sensor 745, a Temperature sensor 730, a battery level sensor, a magnet sensor 705 for detecting whether a magnet is present or not present, a Bluetooth sensor, or a camera sensor 725, optionally a camera sensor 725 configured to detect ambient light, flash, ultraviolet (UV) light, white light, or infrared (IR) light.

The processor 716 is also electrically coupled to the wireless transmitter 740. The wireless transmitter 740 is configured to send sensory information to a server. The sensory information sent by the wireless transmitter to the server may include, without limitation, a unique sensor ID, distances measured by an ultrasonic sensor, camera photos, current bin tilt angles along an x, y, or z axis, GPS location, temperature, battery level of the waste management device, a battery level alert when the battery level is low, a tilt event, a pickup event, a temperature event, a GPS event, date and time sensor measurements or events, a connection type, RSSI level, a date and time of last successful connection, a count of retries since last successful connection, a date and time missed transmissions, a log of settings changes, over the air (OTA) update success/failure events, a magnet status, the sensor board revision level, the sensor board software version, the camera board revision level, or the camera board software version.

The wireless transmitter 721 may use a cellular network and may communicate without limitation via LTE with a 3G fallback. In some embodiments, the wireless transmitter may send sensory information over LTE, LTE catM, 3G, 2G, Bluetooth, or Wifi.

The wireless transmitter 721 may also include a wireless receiver to receive inputs from the server which include, without limitation, security certificates or sensor configuration updates. The wireless receiver may also be configured to receive information for a Received Cell Signal Strength Indicator (RSSI).

In some embodiments, the plurality of sensors 711 of the waste management device 701 includes a multspectrum camera. The multispectrum camera can capture still images, at a variable resolution of up to 1280×800, with different types of illumination and levels of JPEG compression. The types of illumination include, but are not limited to, UV, centre visible, and IR spectrums. The still images can be saved in any digital image file type.

Figure 2:
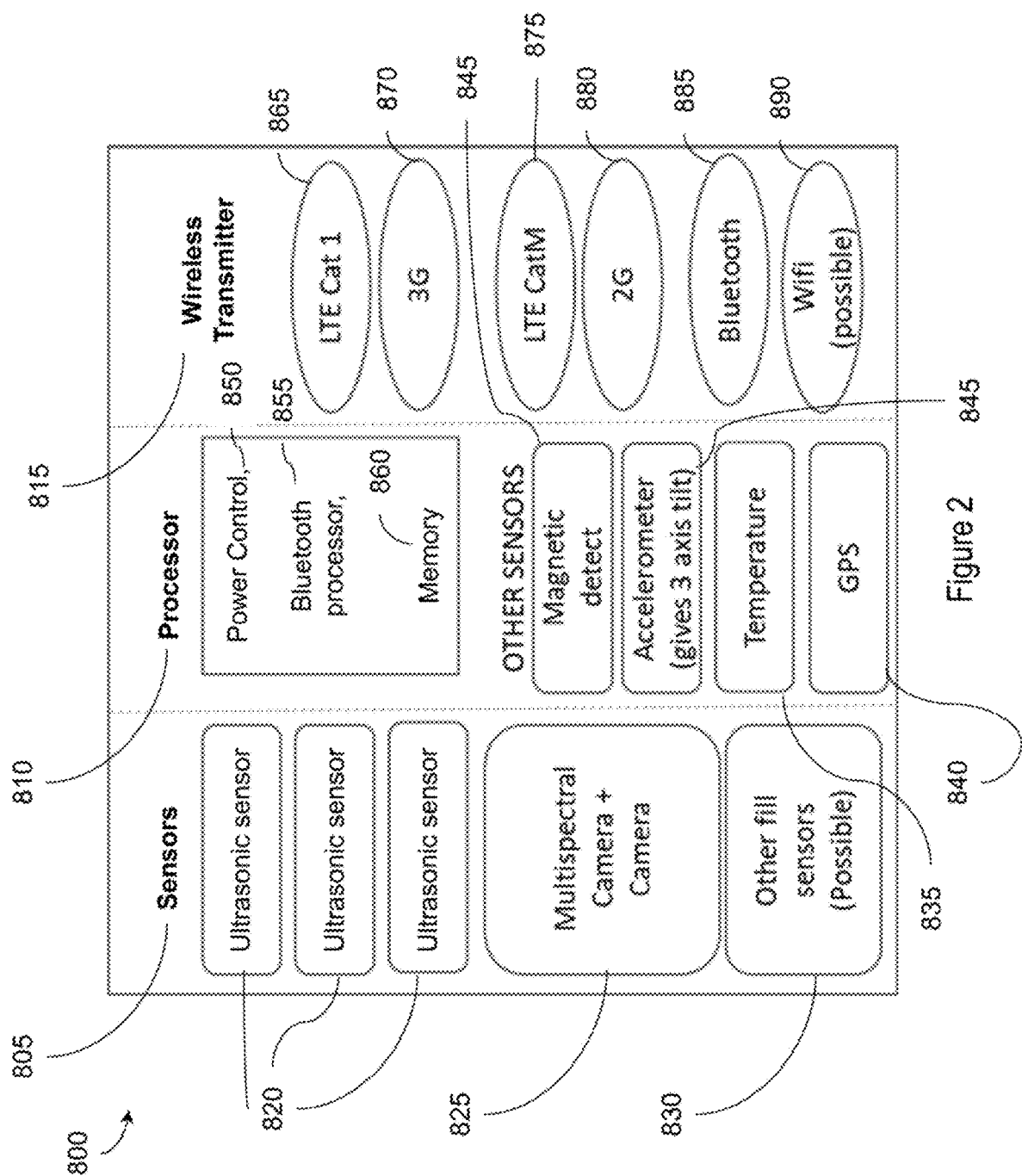
FIG. 2 is a block diagram of components of a waste management device, in accordance with an embodiment.

FIG. 2 shows a block diagram of components of a waste management device 800 according to an embodiment. The waste management device 800 includes a plurality of sensors 805, a processor 810, and a wireless transmitter 815. The plurality of sensors 805 are configured to sense contents of the waste bin. The sensors include three ultrasonic sensors 820, a multispectral camera sensor and a camera sensor combination 825 for detecting the fill level of a waste bin, however a variety of other sensors 830 may be possible for detecting the fill level such as, without limitation, a time of flight sensors, a radar sensor, and a lidar sensor. The plurality of sensors also includes a temperature sensor 835 or a GPS 840 for detecting location, a 3-axis accelerometer 845, and a magnetic detector 850.

The processor 810 is configured to collect sensory information from the plurality of sensors 805. The processor 810 includes power control 850 to control the power state of the waste management device 800. The waste management device 800 also includes a Bluetooth processor 885 to process Bluetooth transmissions. The waste management device 800 is also is configured to store sensory information in memory 860, the memory 860 may be either internal or external memory.

The wireless transmitter 815 is electrically coupled to the processor and configured to transmit the sensory information LTE Cat 1 865, 3G 870, LTE CatM 875, 2G 880, Bluetooth 885, or Wifi 890.

Figure 3:
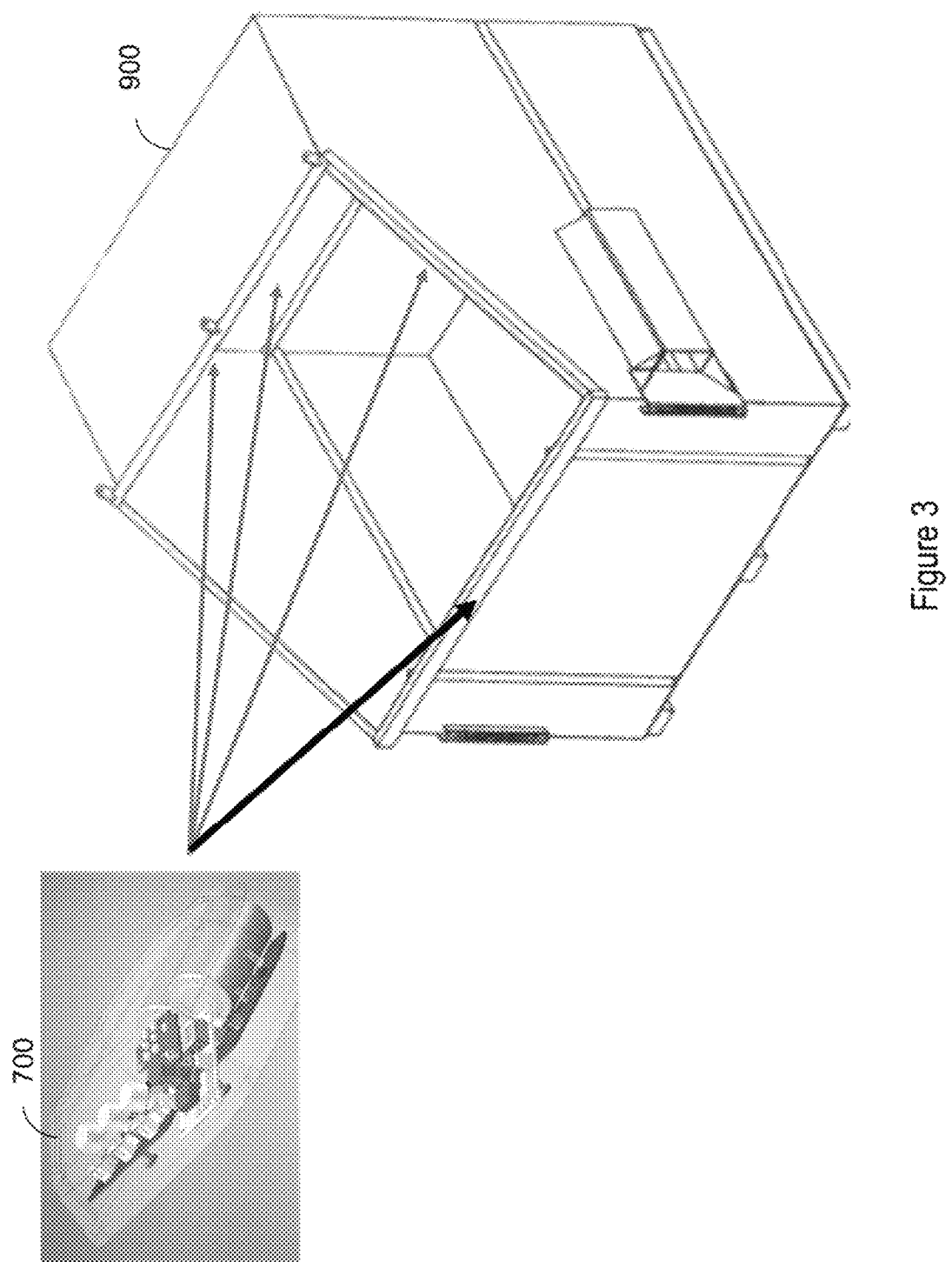
FIG. 3 is the waste management device of FIG. 7A attached to a waste bin.

Referring to FIG. 3, the waste management device 700 is shown being attached the waste bin 900. The waste management device is attached along the interior of the waste bin 900.

Accordingly, the waste management device 700 can be attached to any of the sides or the top of the waste bin. The waste management device 700 is attached to the waste bin 900 such that the sensors can sense the contents of the waste bin 900.

Figure 4:
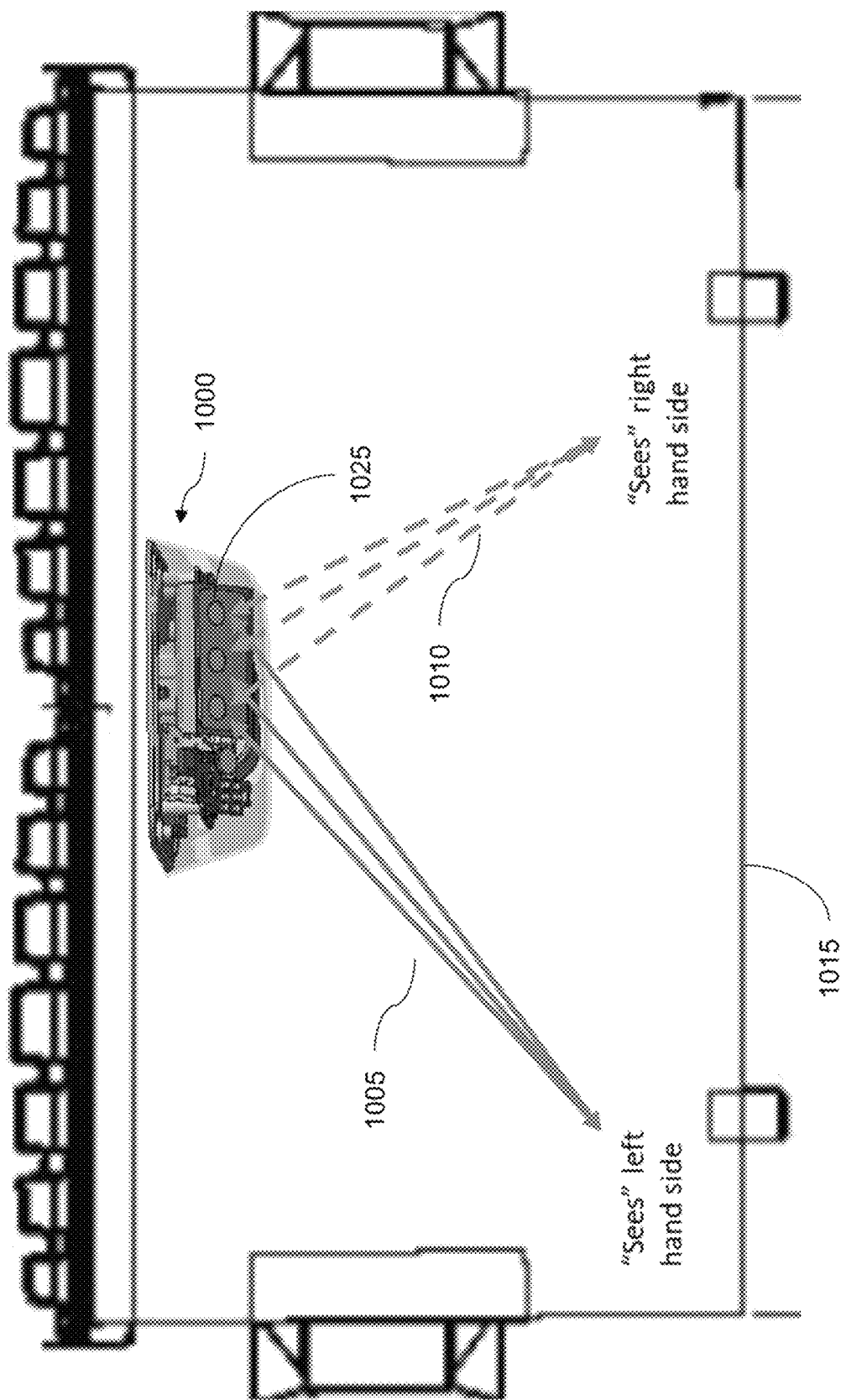
FIG. 4 is a waste management device attached to the top of a waste bin with the plurality of sensors configured in a beamforming arrangement, in accordance with an embodiment.

Referring to FIG. 4, an embodiment is shown of a waste management device 1000 attached to the top of a waste bin 1015 with the plurality of sensors 1025 configured in a beamforming arrangement. An array of three or more sensors of the plurality of sensors allows for beamforming. Individual results from each of the sensors are added together using time delays to increase the strength of the signal from the angle of interest. Changing delay timing changes the angle array and is most sensitive to where the signal comes from. A measurement of time to get a return echo from the direction the pulse was sent is indicative of distance. For an ultrasonic transducer, the distance is calculated from wavelength of the acoustic sound travelling at the speed of sound in air. The plurality of sensors 1025 can be reconfigured with differing time delays to allow for measurement of distance at different points in the waste bin. For example, a first time delay setting 1005 can allow for beam forming to obtain a distance measurement from the left side of the waste bin 1015, while a second time delay setting 1010 allows for beamforming to obtain a distance measurement on the right side of the waste bin 1015.

Figure 5:
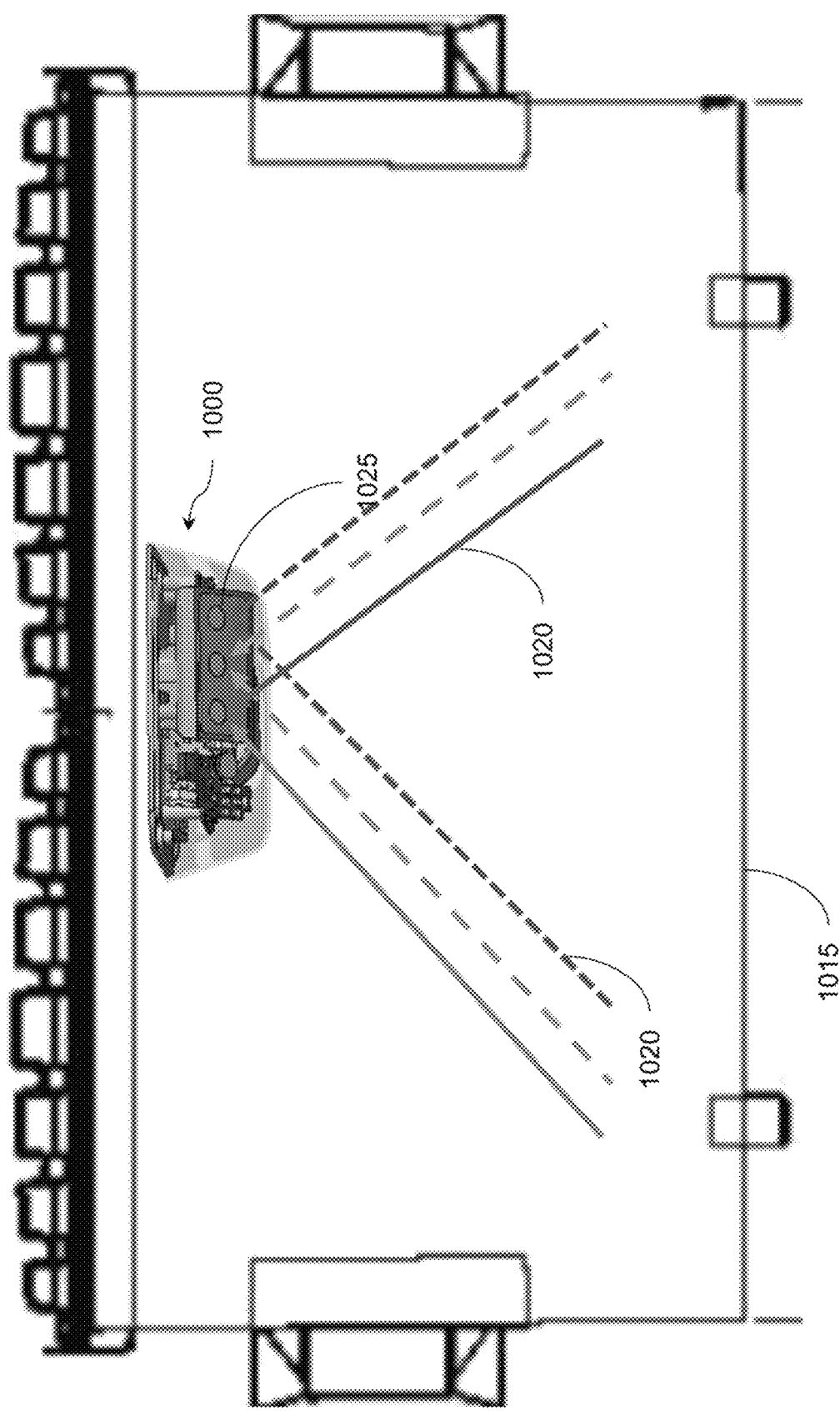
FIG. 5 is a waste management device attached to the top of a waste bin with the plurality of sensors configured to allow for weighted voting, in accordance with an embodiment.

Referring to FIG. 5, an embodiment is shown of a waste management device 1000 attached to the top of a waste bin 1015 with the plurality of sensors 1025 configured to allow for weighted voting. Three sensors of the same type of the plurality of sensors are configured in an array 1020 to allow for weighted voting on sensor distance measurements. Individual calculated distance results from each sensor are subjected to a median algorithm where multiple measurements taken and the smallest and largest measurements are eliminated and the median value of rest is kept as the valid measurement and then compared other sensors values with 2 out of 3 voting to select the most likely real value for the clear distance remaining in the waste bin. The use of multiple sensors of the same type allows for improved accuracy of the sensor reading. Without limitation, a person skilled in the art would readily understand a variety of other methods could also be used for obtaining a combined measurement. For example, the values could alternatively the mean or mode value of the measurements could be used.

Figure 6:
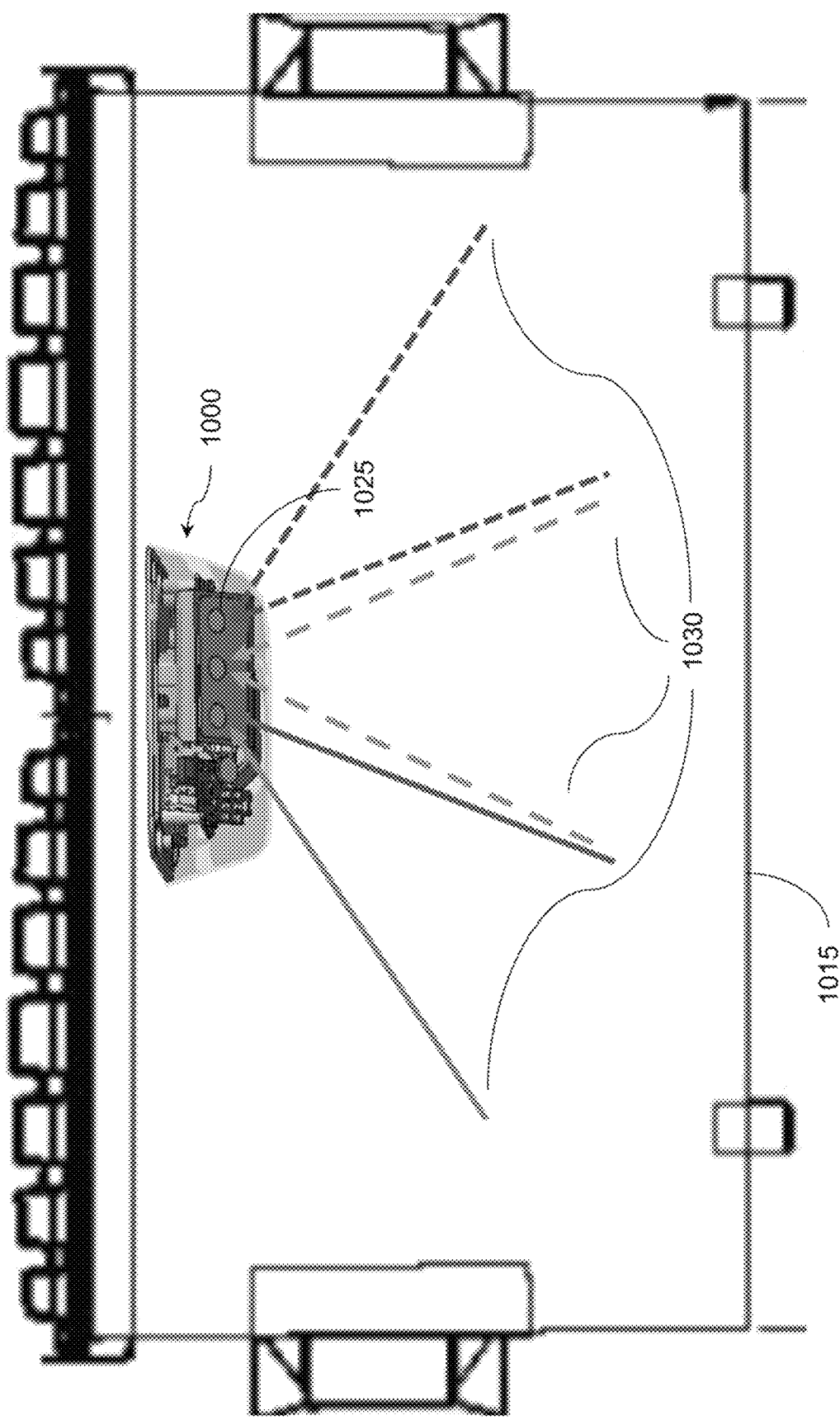
FIG. 6 is a waste management device attached to the top of a waste bin with the plurality of sensors configured in different directions, in accordance with an embodiment.

Referring to FIG. 6, an embodiment is shown of a waste management device 1000 attached to the top of a waste bin 1015 with the plurality of sensors 1025 configured in different directions 1030. An array of sensors of the same type allows location specific distance measurements within waste bin by orienting the sensors in different directions in the waste bin. Individual calculated distance results from sensors may still be subjected to a median algorithm but each sensor distance represents a portion of a fill level map of the waste bin, thereby providing a more accurate overall fill level than measurements of a single point of the waste bin 1015.

More sensors allow for better collection of sensory information from the waste bin 1015 and more measurements of the fill level at different points in a waste bin 1015 resulting in better estimates for the fill level than if only one sensor was used. Multiple sensors of 3 or more means that the sensors could be used in an array with computable directional sensitivity. For example, with at least 3 or more sensors, the waste bin 1015 can be scanned by adding portions of sensor responses to other sensor values to increase sensitivity selectively in a particular direction then redoing this with other portions of the sensor responses, thereby also increasing the sensitivity in a different direction. This enables multi-directional readings without moving the sensor.

The plurality of sensors 1025 improves over the use of a single sensor by providing multi directional responses, software changeable directional responses, and response verification through the comparison between sensors within that sensor type to improve the accuracy of a measure of the waste bin fill level being measured by the sensor.

Figure 7:
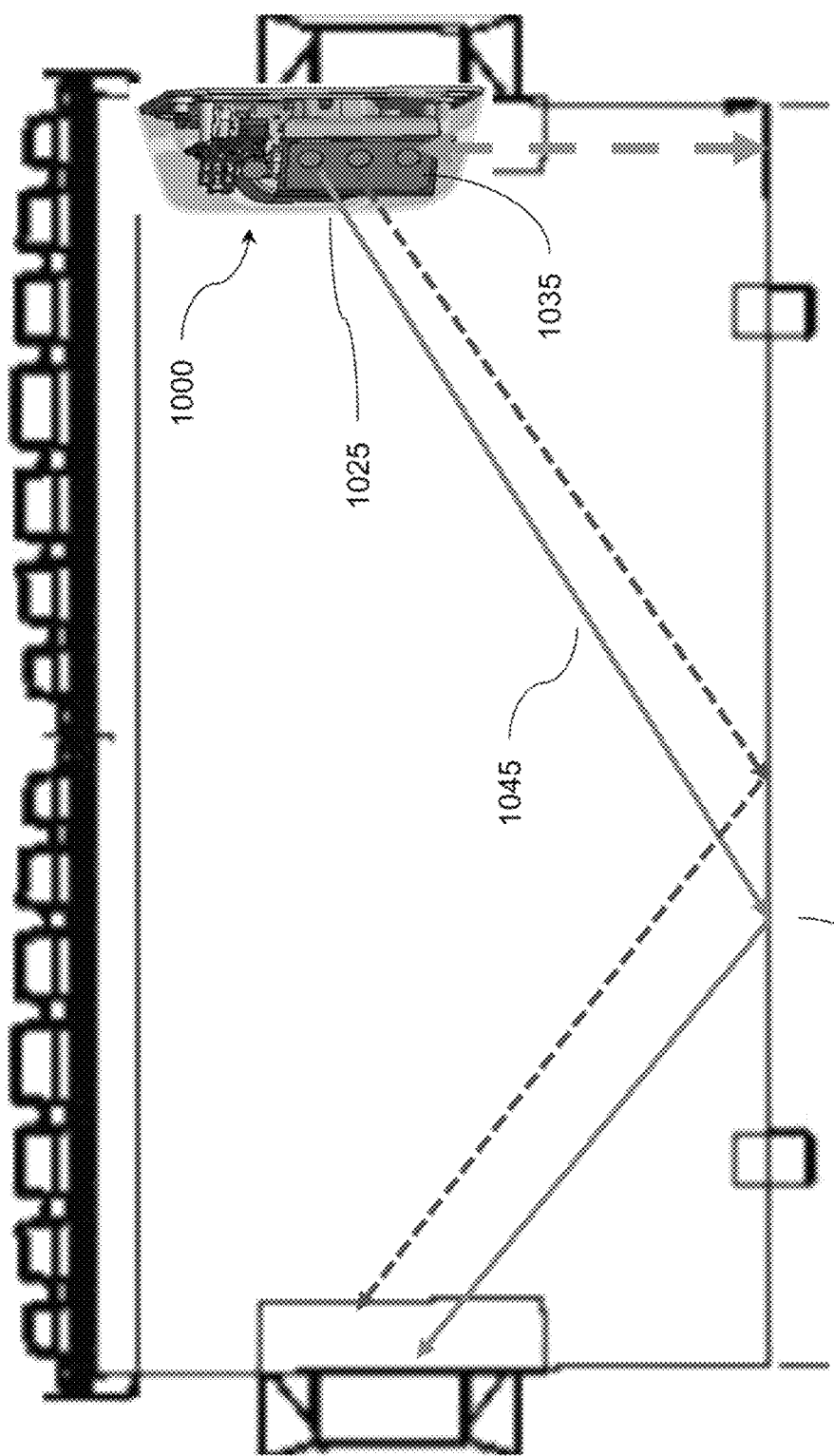
FIG. 7 is a waste management device attached to the side of a waste bin with the plurality of sensors configured such that a sensor is configured to be oriented in a direction to confirm the distance to the bottom of the waste bin, in accordance with an embodiment.

Referring to FIG. 7, an embodiment is shown of a waste management device 1000 attached to the side of a waste bin 1015 with the plurality of sensors 1025 configured such that a sensor 1035 is configured to be oriented in a direction to confirm the distance to the bottom of the waste bin 1015. Dedicating a single sensor from the set of same type allows specific distance measurements to the bottom of the waste bin when empty. Ultrasonic sensors suffer a serious flaw in that a lack of reflected signal from an object, such as when nothing is located in the time of flight window 1045, is identified by the sensor as the same as something is too close to the sensor, as the sensor is still ringing from drive pulses. If the sensor does not see an object, the measurement given by the sensor will be the maximum distance of the sensor and if the waste bin 1015 is full and an object is too close to the ultrasonic transducer, it also puts out the maximum distance reading (interpreted as empty). Configuring at least one sensor 1035 to be oriented in a direction to confirm the distance to the bottom of the waste bin 1015 solves the problem with the use of existing sensors as there is a guaranteed distance to reflect from when the waste bin 1015 is empty.

Referring to FIG. 8, an embodiment is shown of a waste management device 1000 attached to the top of a waste bin 1015 with the plurality of sensors including a sensor that is tuned 1115 and another sensor that is untuned 1105.

Graphs are shown representing the signal strength of the tuned sensor 1125 vs the untuned sensor 1135. The untuned sensor 1135 provides a weaker signal than the tuned 1125 sensor despite sensing the same contents.

The plurality of sensors 1025 can be reconfigured by the server by remotely tuning the plurality of sensors for optimal signal return based on the material being scanned. Adjustment for power output, length of pulse train, time varying gain and thresholds allows for customization insitu.

The ability to reconfigure the plurality of sensors 1025 remotely improves over fixed sensors which cannot be reconfigured without manually changing the circuit board. Reconfiguring sensors allows the sensor to provide better, more consistant and accurate results. In the case of ultrasonic transducers, having changeable driving voltage, number of excitation pulses, and response sensitivity on the fly allows for improved distance measurements for the ultrasonic sensor. Reconfiguring specifically for the material being measured means improved signal to noise ratios and more consistent and accurate measurements which leads to better efficiencies in the operation with less garbled or erroneous signaling. In the case of the multispectral camera, the tuning allows for photos that maximize the returned images contrast and tonal depth dependent on the materials in the waste bin 1015 or contaminant in the waste bin 1015.

The tunable nature of ultrasonic sensors and camera sensors allows for maximization of signal to noise ratios and therefore provides better consistent, better quality measurements.

Referring to FIG. 9, an embodiment is shown of a waste management device 1000 attached to the top of a waste bin 1015 with the plurality of sensors 1025 including a sensor that is tuned 1215 by artificial intelligence (AI) or machine learning techniques and another sensor that is untuned 1205. Whereas the untuned sensor is unable to detect the type of object 1235 in the waste bin 1015, the AI tuned sensor is able to detect 1245 the contamination 1225.

The server 731, optionally a cloud server, can provide for detection of contamination using camera and multispectral camera sensors by reconfiguring the plurality of sensors for optimal visual recognition of the contamination 1225 based on an AI or machine learning algorithm. The AI can be trained to detect the presence of contamination by training a machine learning model to recognize images of the related contamination. The AI is trained using high quality known datasets of labelled images. This known content allows the AI learning algorithm to correctly set itself up. Data sets can be generated by a number of methods, for example a method may be to use Amazon Mechanical Turk (AMT) and crowdsource for data validation against the provided data to generate a known dataset for training. AMT would go through provided photos from waste bins and annotate those with the discernable contamination and the type. This annotated subset would be used for training an AI.

Figure 10:
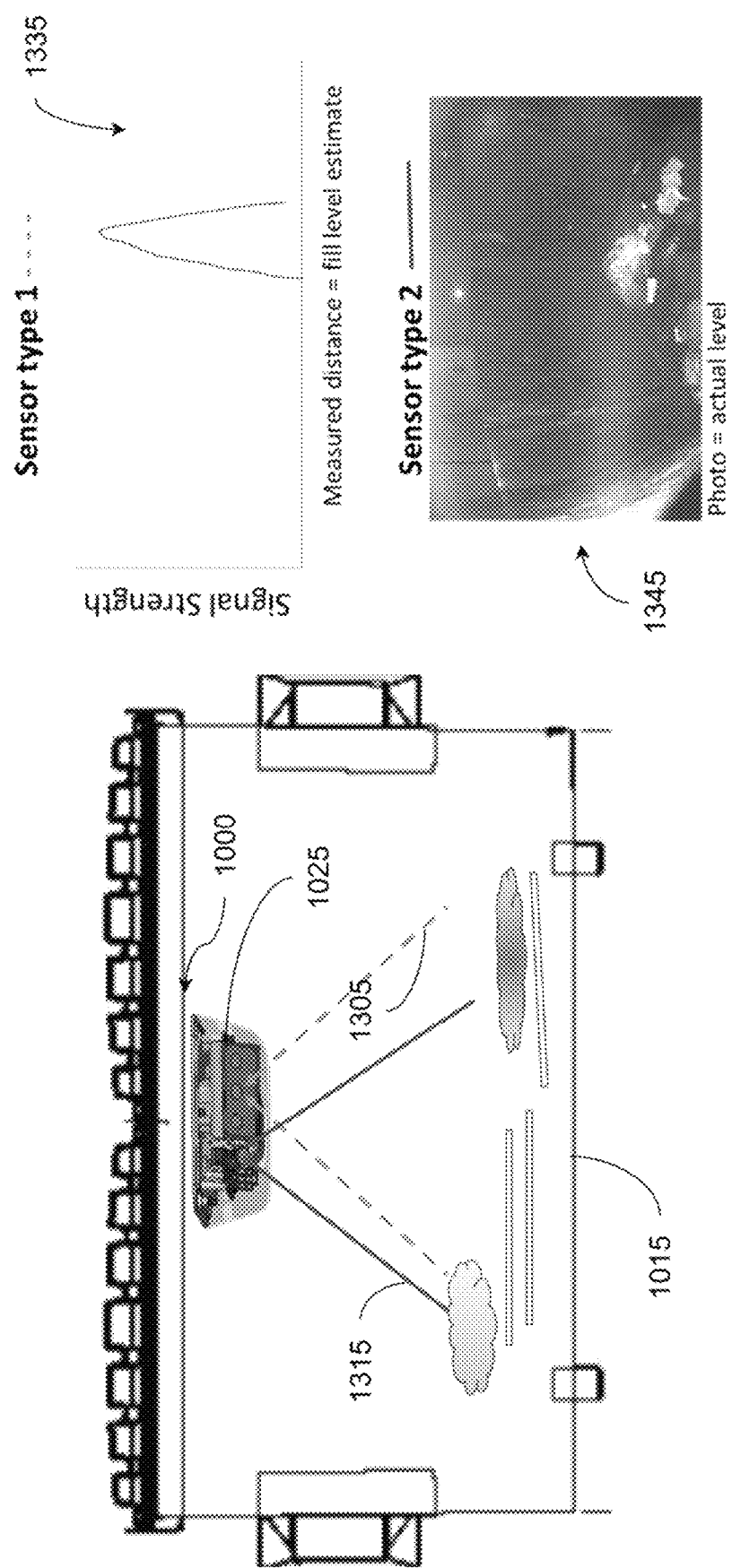
FIG. 10 is a waste management device attached to the top of a waste bin with the plurality of sensors including at least two different types of sensors for cross-verification, in accordance with an embodiment.

Referring to FIG. 10, an embodiment is shown of a waste management device 1000 attached to the top of a waste bin 1015 with the plurality of sensors 1025 including at least two different types of sensors for cross-verification.

Determining the fill level based on the sensory information of at least two different types of sensors allows for cross verification of a sensor signal. The first sensor signal 1305 is shown detecting a signal 1335, however, upon verification with the camera sensor 1315, the actual fill level is verified 1345 and the first sensor reading and its resulting fill algorithm 1305 is adapted to more closely correlate with the visual sensor. For example, if sensor type 1 was indicating a fill level of 25% but sensor type 2 showed 35% an offset could be added to sensor 1 type readings by 10% so sensor type 1 would read 35%. Correcting sensor measurements is particularly powerful once the known correlation is found so that the correlation can be used without reference to sensor type 2. If sensor type 2 became occluded and an image could not be viewed to determine the fill level, the corrected sensor type 1 can be used to continue with an accurate fill level even though sensor type 2 is no longer working. In a similar manner, sensor type 1 can be used alone in the same type of bin to allow for obtaining an accurate fill level.

Using at least two different sensor types means that the results of the remote measurements can be cross-correlated against any single sensor type providing a mechanism for confirmation of correct operation and remote calibration which improves the accuracy of the readings leading to better efficiencies in the system operation.

Cross verification of the sensors in the device provides a large improvement over the use of a single sensor by allowing for remotely confirming correct and accurate operation of the sensor type, providing a mechanism for the sensor type to be remotely calibrated and providing parallel but different measurement technologies which also can significantly extend the time between service calls to the device as both sensor types would have to be impacted before service would be required.

Figure 11:
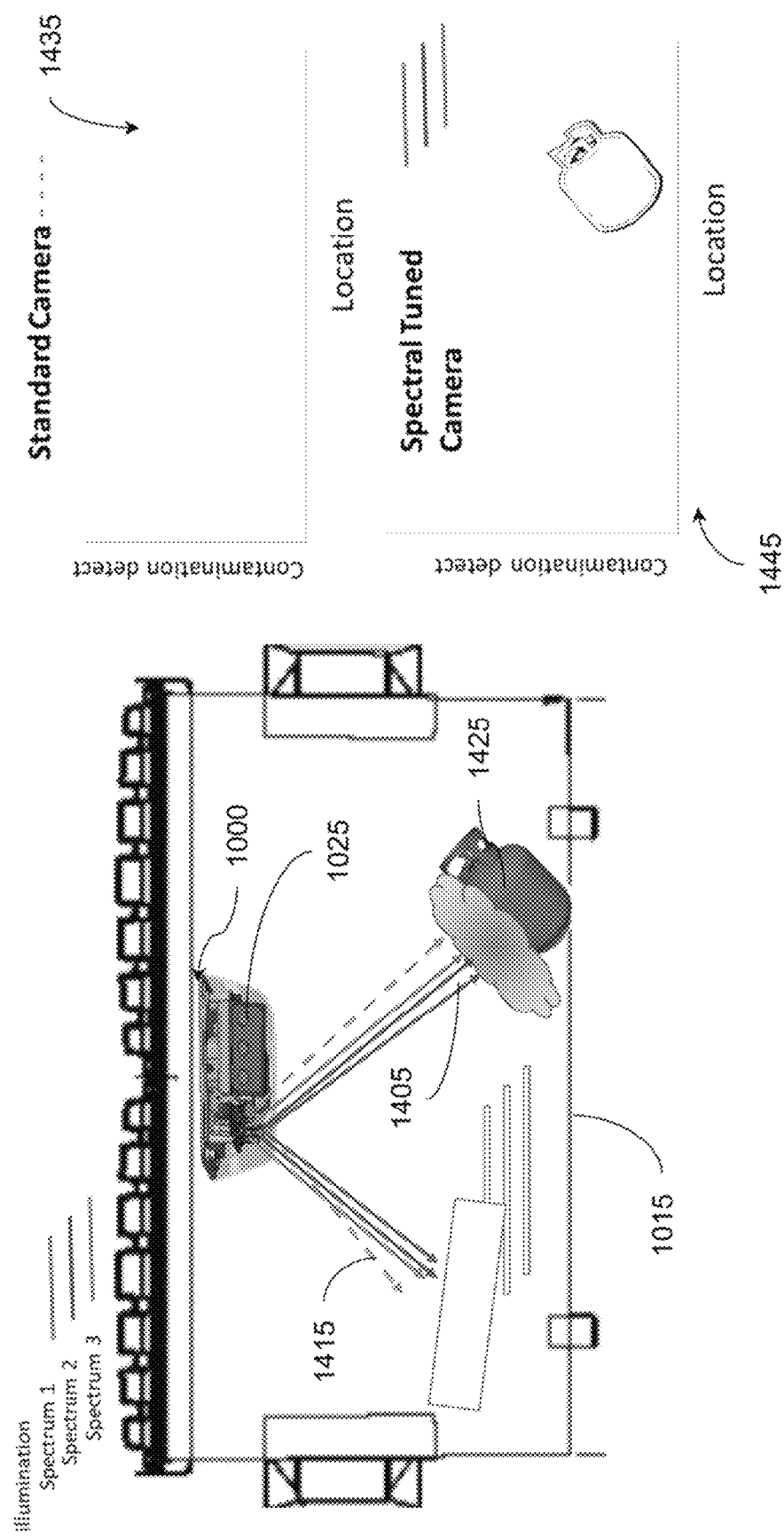
FIG. 11 is a waste management device attached to the top of a waste bin with the plurality of sensors including a multispectral camera sensor and a visible light camera sensor, in accordance with an embodiment.

Referring to FIG. 11, an embodiment is shown of a waste management device 1000 attached to the top of a waste bin 1015 with the plurality of sensors 1025 including a multispectral camera sensor 1405 and a visible light camera sensor 1415. While the visible light camera sensor 1415 is unable to provide an image under the lighting conditions 1435, the multispectral camera sensor is able to provide an image of the screened propane tank after configuring the sensor for the relevant lighting conditions 1445. Sensors can be tuned for optimal visual definition based on the light used during image capture. Adjustment for illumination wavelength affects the returned light spectrum and highlights different features from normal visible light spectrum. Sensory information from the multispectral camera sensor 1405 can be also be used to determine contamination in waste bin 1015. AI and machine learning techniques can be applied by the server in order to detect contamination using sensory information collected by the multispectral camera sensor 1405.

Using a multispectral camera sensor 1445 significantly extends the capability to highlight items shown in the photograph taken based on the spectrum of light used for illumination.

The multispectral camera sensor 1445 improves on the use of a visible light camera sensor alone because photographs depend on reflected light to determine what shows in the image. Different materials reflect light differently depending on the wavelength illuminating the material. The different percentage of reflectance of materials depending on lighting spectrum used means that the visible feature set in a photo is different under different frequencies of light.

Showing different materials more clearly allows better human interpretation. Further, sensory information from the multispectral camera sensor allow for improved machine learning and artificial intelligence training and thereby providing more consistent and accurate contamination determination which leads to better efficiencies in the operation. In the case of the multispectral camera 1445 the tuning allows for photos that maximize the returned images contrast and tonal depth dependent on the materials in the waste bin or contaminant in the waste bin 1015.

Figure 12:
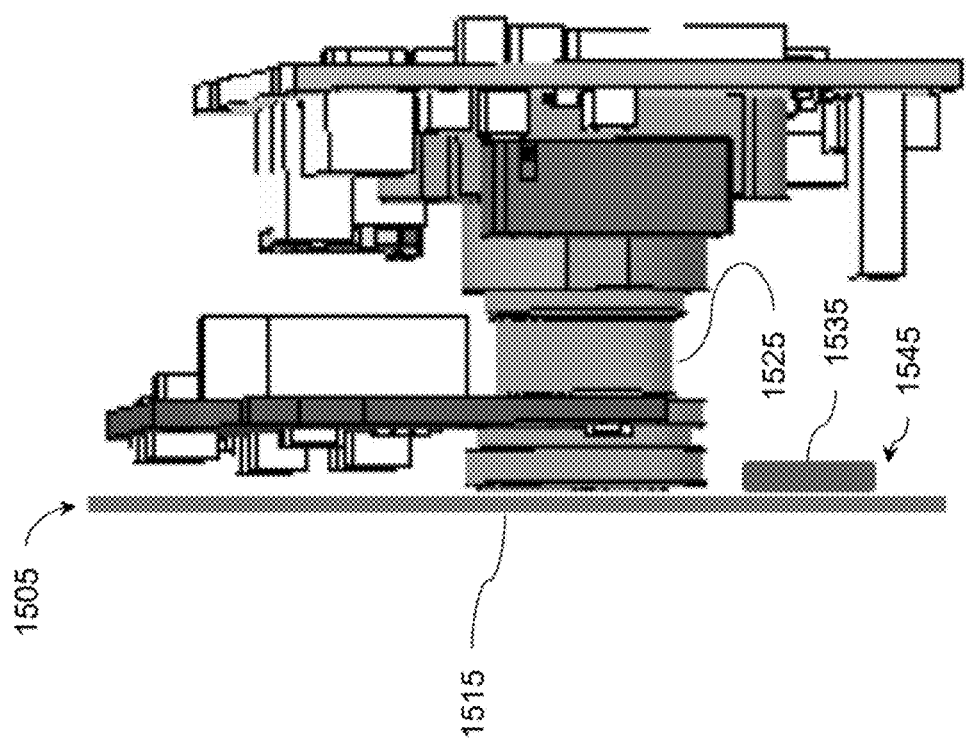
FIG. 12 is a sensor of the waste management device with a protective lens to prevent occlusion of the sensor, in accordance with an embodiment.

Referring to FIG. 12, an embodiment of a sensor of the waste management device is shown with a protective lens 1505 to prevent occlusion of the sensor 1525. The protective lens is configured to prevent occlusion of at least one sensor of the plurality of sensors.

The waste management device uses a protective lens 1505 which is a special high impact, scratch resistant lens cover glass that has an anti-stick coating 1515 to prevent detritus sticking to it. A displacement device 1535 is also used alongside the anti-stick coating for displacing detritus and preventing occlusion of the sensor 1525.

The displacement device is a vibrational device 1545 which can be vibrated at a fixed or variable frequency and driving voltage. The vibration device 1545 is used for driving vibrations into the protective lens 1505 and cleaning it by ejecting material on the surface.

In an embodiment, the protective lens 1505 allows for mechanisms to clean off the protective lens 1505 material and prevent materials from sticking to the cover material.

The protective lens 1505 improves the sensory information obtained by the plurality of sensors 1025 because photographs depend on reflected light reaching the lens of the camera. If the lens cover material becomes obscured, the sensor, and therefore the waste management device 1025, becomes impaired or useless for its measurement task until a physical visit is made to the location with cleaning materials. Even with proper and careful cleaning the protective lens 1505 can become scratched or otherwise permanently occluded. Extending the time until the sensor 1525 is occluded or preventing the protective lens 1505 from becoming occluded are significant improvements driving productivity, lowering costs and raising efficiency.

The waste management device 1025 uses a protective lens 1505 which is a high impact, scratch resistant cover glass that has coatings to prevent detritus sticking to it combined with a displacement device 1535 for driving vibrations into the cover glass material cleaning it by ejecting material on the surface.

Figure 13:
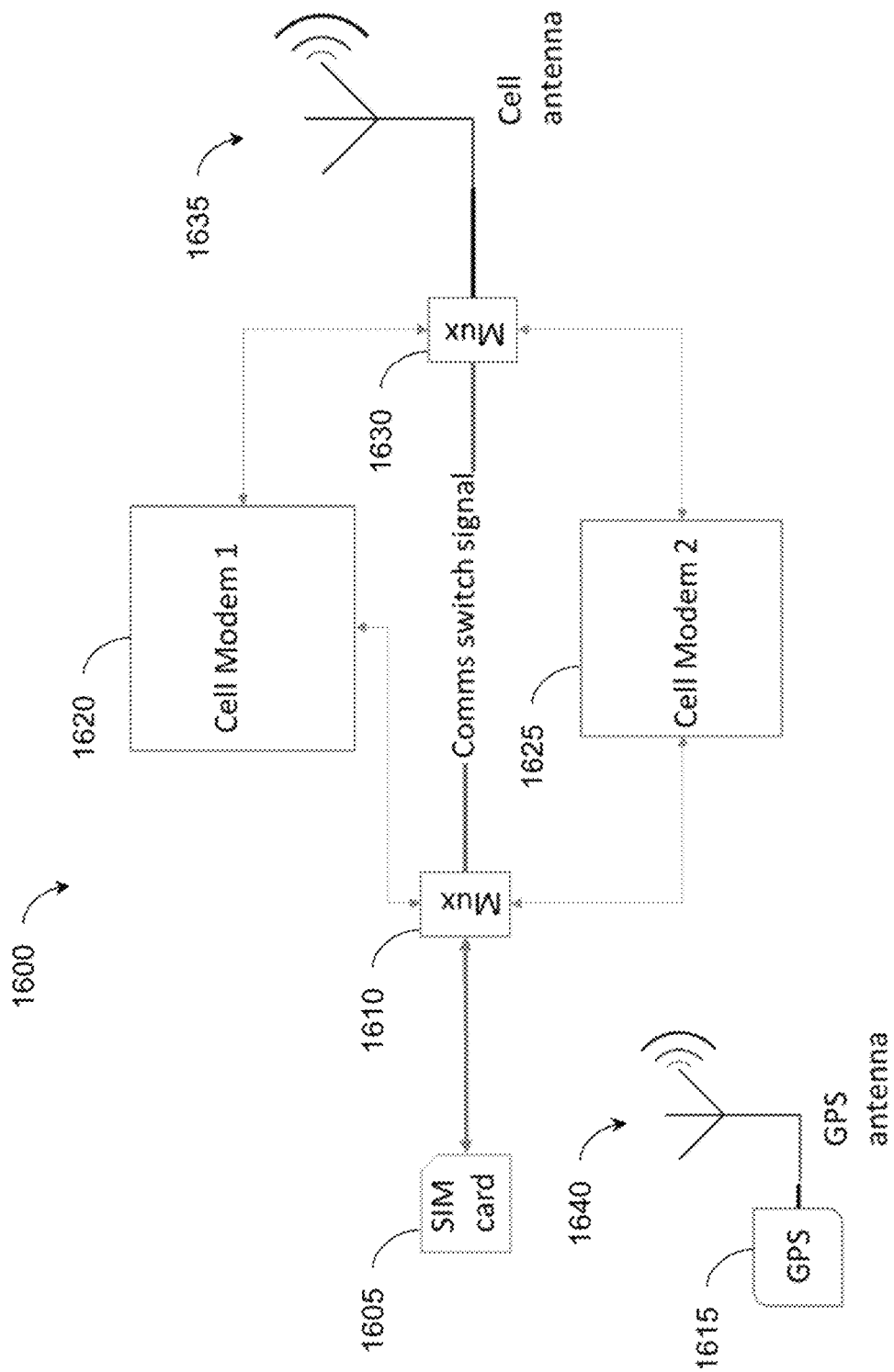
FIG. 13 is a block diagram of a wireless transmitter of the waste management device, in accordance with an embodiment.

Referring to FIG. 13, a block diagram of an embodiment of the wireless transmitter 1600 of the waste management device 1025 is shown. The wireless transmitter 1600 incorporates multiplexers (muxs) 1610, 1630 to allow the use of a single sim card and cell antenna for multiple modems.

The multiplexer allows for switching between cell modem 1 1620 and cell modem 2 1625. The wireless transmitter 721 also includes a cell antenna 1635 for transmitting the cellular signal.

A GPS antenna 1640 is also included to allow for transmitting and receiving a GPS signal from the GPS sensor 1615 without the cell modems being turned on.

In an embodiment, the wireless transmitter 721 includes at least two cellular modems and is configured to be compatible with several networks. The at least two cellular modems allow connection wherever there is a cellular network because all networks are supported.

The use of multiple modems allows for improved connection for devices which are stationary. The use of a single cellular modem was built for mobile devices. They are predicated on the concept of connection wherever the network is and assume that if the network is not present the device will move or soon be moving to a location with a network connection. The use of multiple cellular modems improves the use of a mobile cellular modem in a device which is attached to static, non-moving waste bin. If the sensor cannot move from where it is attached it needs to connect from wherever it is located. With multiple modems sharing common peripherals the waste management device can reliably connect wherever a network is present independent of the type of network whereas the closest embodiment often barely connect to a network as the single type of network it needs is barely available or not even present.

Figure 14:
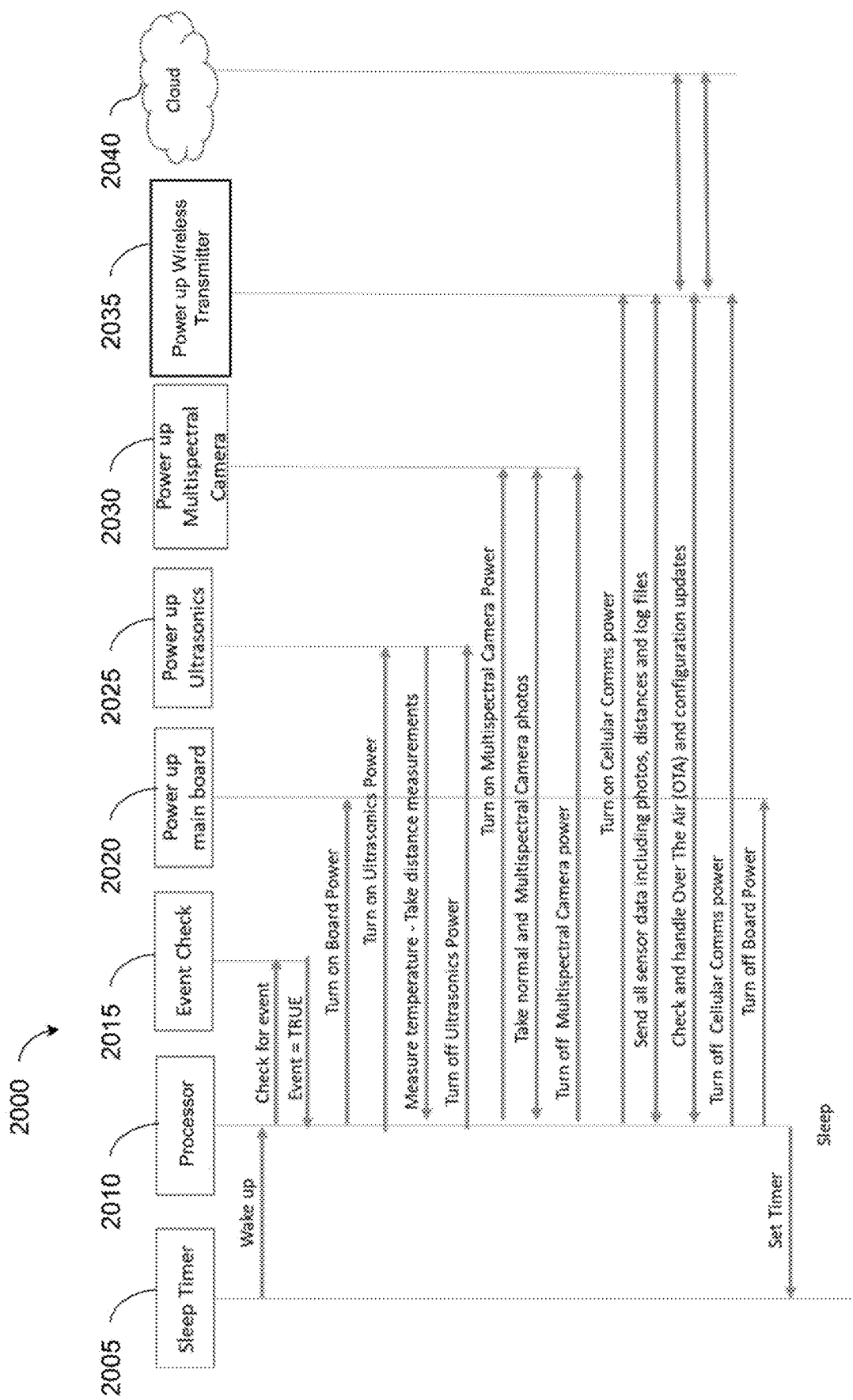
FIG. 14 is a flow diagram of a sensor firmware operation method, in accordance with an embodiment.

Referring to FIG. 14, a flow diagram shows an embodiment of a sensor firmware operation method 2000. A sleep timer 2005 allows for waking up the processor 2010, the processor 2010 is also configured to modify the sleep timer 2005. The processor is configured to check for an event 2015, if the event is returned as true, the processor is configured to turn on power to the board 2020 and can conduct different acts based on the event. The processor 2010 is also configured of turn off power to the board 2020.

The processor 2010 is configured to turn on the ultrasonic sensor 2025 and collect distance measurements, alternatively the processor 2010 is configured to collect temperature measurements from a temperature sensor. Following the measurements, the processor 2010 is configured to turn off the ultrasonic sensor 2025.

The processor 2010 is also configured to turn on the multispectral camera sensor 2030 and camera sensor. The processor 2010 is configured to collect multispectral images and camera images from the multispectral camera sensor 2030 and camera sensor respectively. Following collection of the images, the processor 2010 is configured to turn off the multispectral camera sensor 2030 and camera sensor.

The processor 2010 is also configured to turn on the wireless transmitter 2035. The processor 2010 is configured to send the sensory information collected from the plurality of sensors, including without limitation the photos, distances, and log files, to the wireless transmitter. The processor is also configured to check for OTA updates through the wireless transmitter and to install updates once they are received by the wireless transmitter 2035. The processor 2010 is also configured to turn off the wireless transmitter 2035. The wireless transmitter 2035 is configured to connect with a cloud server 2040.

Figure 15:
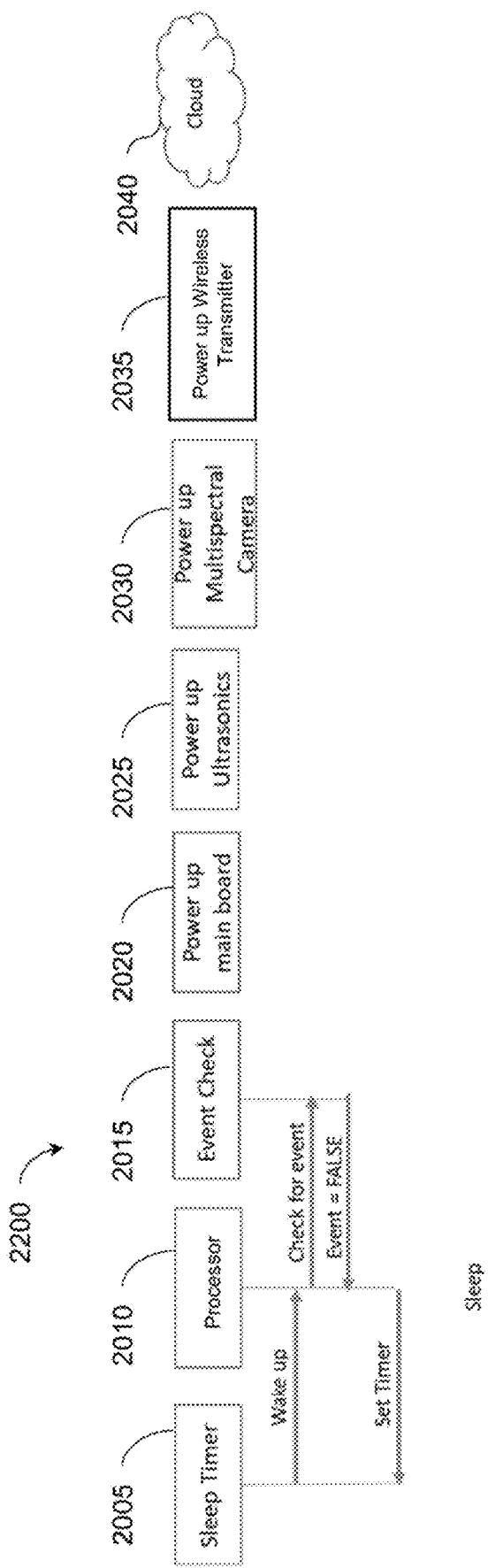
FIG. 15 is a flow diagram of a sensor firmware operation method if an event check returns as false, in accordance with an embodiment.

Referring to FIG. 15, a flow diagram shows an embodiment of a sensor firmware operation method 2200 if an event check 2015 returns as false. A sleep timer 2005 allows for waking up the processor 2010, the processor 2010 is also configured to modify the sleep timer 2005. The processor 2010 is configured to check for an event 2015, if the event is returned as false, the processor 2010 returns to sleep.

Figure 16:
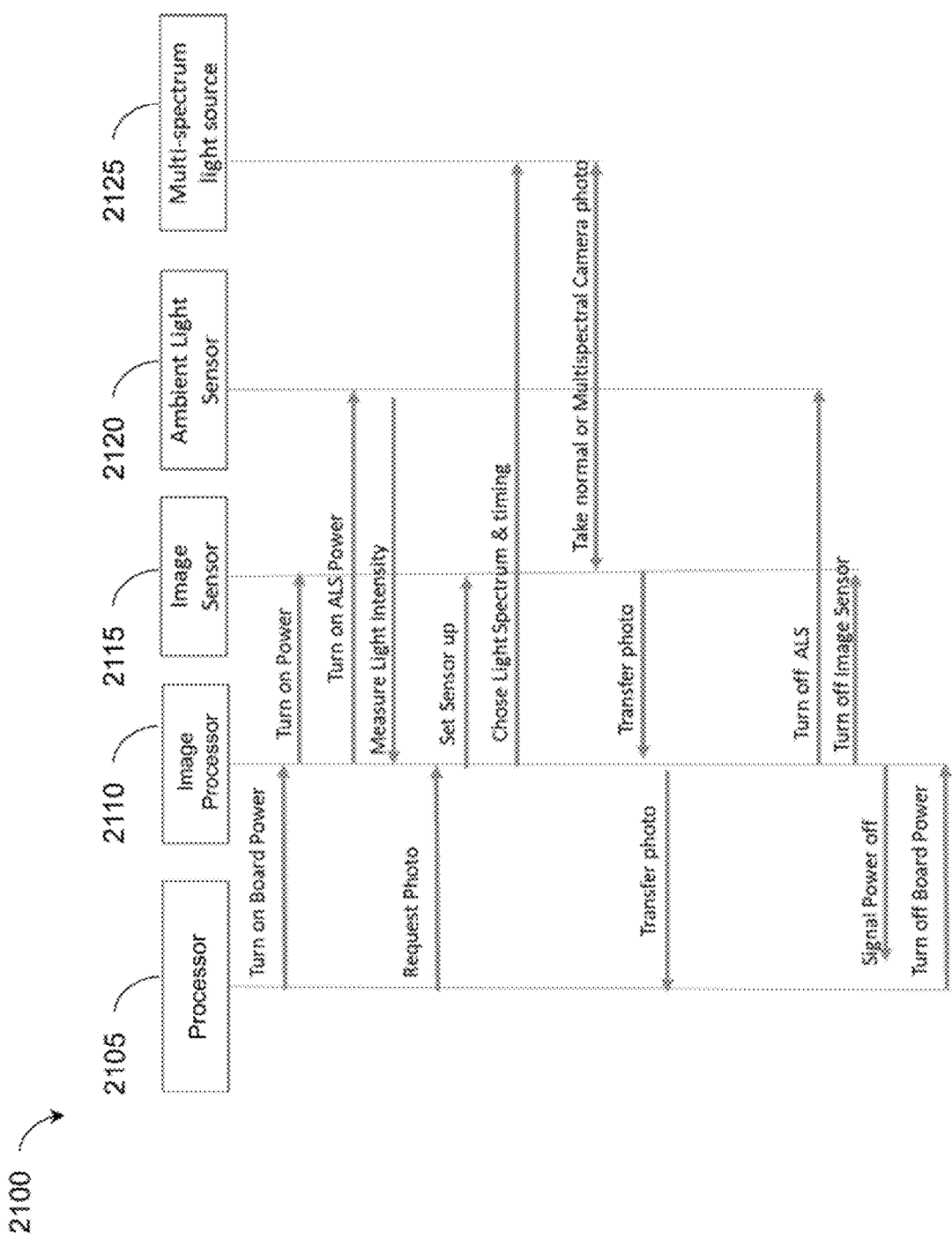
FIG. 16 is a flow diagram of a sensor firmware operation method for a multispectral camera sensor, in accordance with an embodiment.

Referring to FIG. 16, a flow diagram shows an embodiment of a sensor firmware operation method 2100 for a multispectral camera sensor. The processor 2105 includes an image processor 2110 for processing image sensory information.

The processor is configured to turn on power to the image process 2110, request images, collect image information from the image processor, and turn off power to the image processor 2110.

The image processor 2110 is configured to turn on power to an image sensor 2115, set up the image sensor 2115, collect image information from the image sensor 2115, and turn off power to the image sensor 2115.

The image processor 2110 is also configured to turn on power to an ambient light sensor 2120, collect light intensity information from the ambient light sensor 2120, and turn off power to the ambient light sensor 2120. The image sensor 2115 may be a camera sensor.

The image processor 2110 is also configured to turn on a multispectrum light source 2125, optionally including a multispectral camera sensor 2030. The image processor 2110 is configured to choose the light spectrum and timing. The image processor 2110 is also configured to take normal or multispectral camera photos with the multispectral camera sensor and multispectrum light source 2125.

Figure 17:
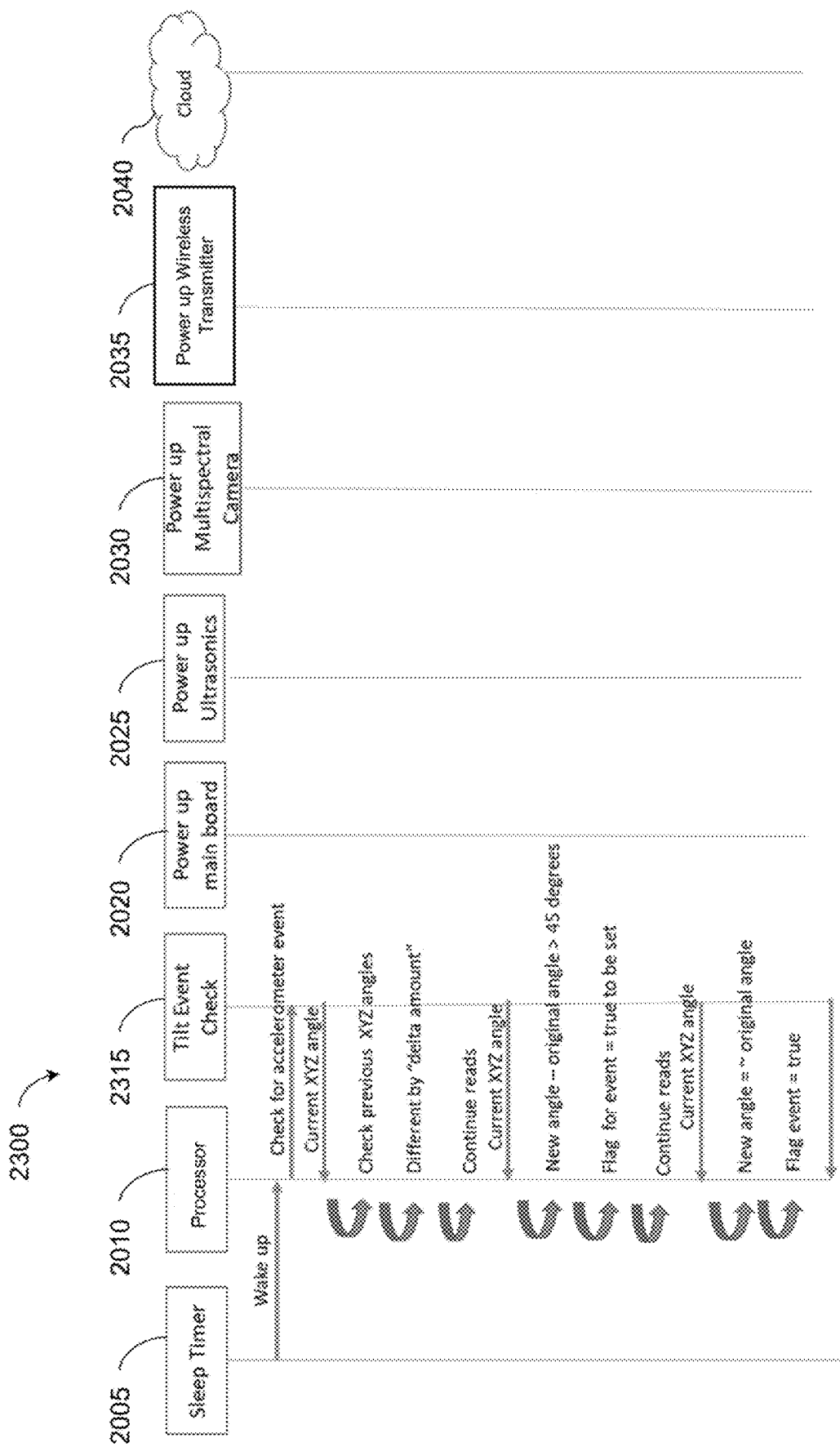
FIG. 17 is a flow diagram of a sensor firmware operation method for an accelerometer sensor, in accordance with an embodiment.

Referring to FIG. 17, a flow diagram shows an embodiment of a sensor firmware operation method 2300 for an accelerometer sensor. A sleep timer 2005 allows for waking up the processor 2010, the processor 2010 is also configured to modify the sleep timer 2005.

The processor 2010 is configured to check for a tilt event 2315 by collecting sensory information from the accelerometer. The processor receives the current angle along the x, y, and z-axis. The processor 2010 is configured to check the angle against the previous x, y, and z-axis and calculate a delta amount of the difference. If the new angle has a delta amount difference greater than 45 degrees, the tilt event check 2315 returns a true event to be set. The processor 2010 is configured to conduct additional checks for the current angle along the x, y, and z-axis and if the new angle returned is approximately the same as the first reading, the true even flag is confirmed.

Following the true event flag, the sensory information is transmitted to the wireless transmitter 2035 for transmitting to the cloud server 2040.

Figure 18:
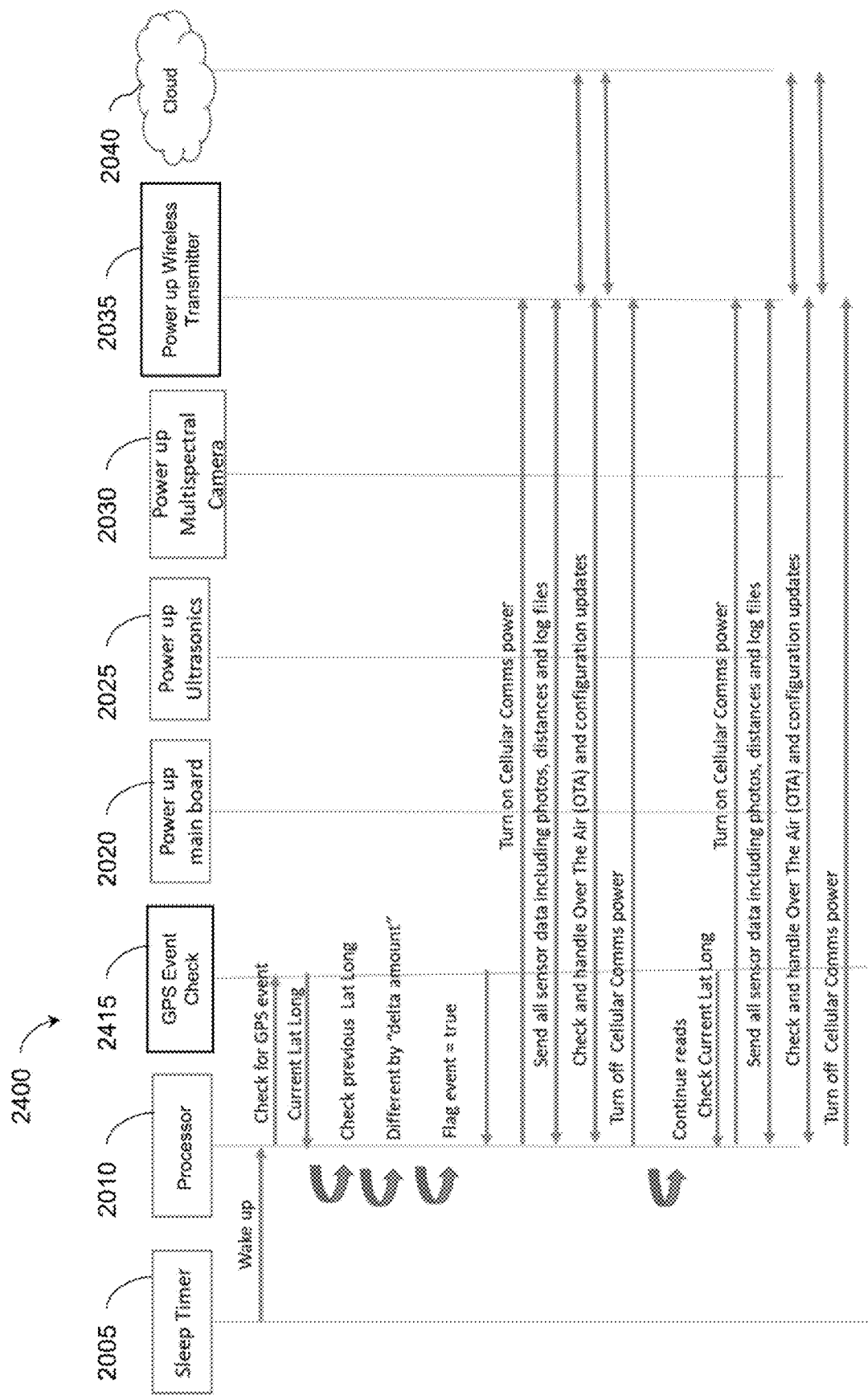
FIG. 18 is a flow diagram of a sensor firmware operation method for an GPS sensor, in accordance with an embodiment.

Referring to FIG. 18, a flow diagram shows an embodiment of a sensor firmware operation method 2400 for an GPS sensor. A sleep timer 2005 allows for waking up the processor 2010, the processor 2010 is also configured to modify the sleep timer 2005.

The processor 2010 is configured to check for a GPS event 2415. The processor 2010 is configured to collect the current latitudinal and longitudinal position of the waste management device. The current position is different from the previous position, a delta difference is calculated and the event is flagged as true. The processor 2010 is configured to then turn on the wireless transmitter 2035, send all sensory information to the wireless transmitter for transmitting to the cloud server 2040, check and handle OTA and configuration updates, and then turn off the wireless transmitter 2035. The processor 2010 then checks for a GPS event again and repeats the above steps until there are no changes to the longitudinal and latitudinal positions.

Figure 19:
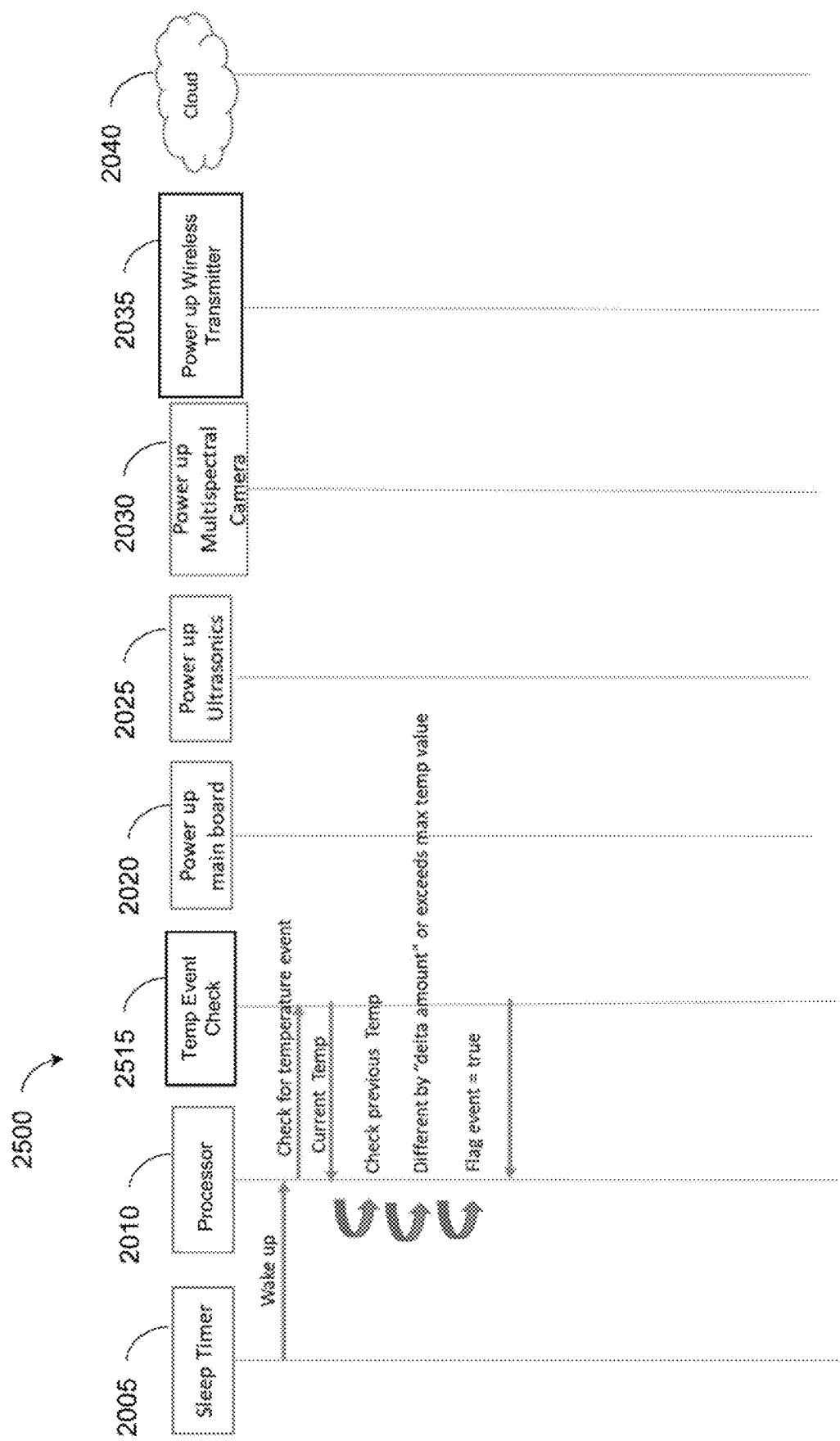
FIG. 19 is a flow diagram of a sensor firmware operation method for a temperature sensor, in accordance with an embodiment.

Referring to FIG. 19, a flow diagram shows an embodiment of a sensor firmware operation method 2500 for a temperature sensor. A sleep timer 2005 allows for waking up the processor 2010, the processor 2010 is also configured to modify the sleep timer 2005.

The processor 2010 is configured to check for a temperature event 2515. The processor 2010 is configured to collect the current temperature and compare the measurement with the previous temperature and calculate a delta amount difference. The processor 2010 is also configured to identify if the temperature exceeds a maximum temperature value. If there is a difference between the two values or if the value exceed the maximum value, the event is flagged as true.

Following the true event flag, the sensory information is transmitted to the wireless transmitter 2035 for transmitting to the cloud server 2040.

Figure 20:
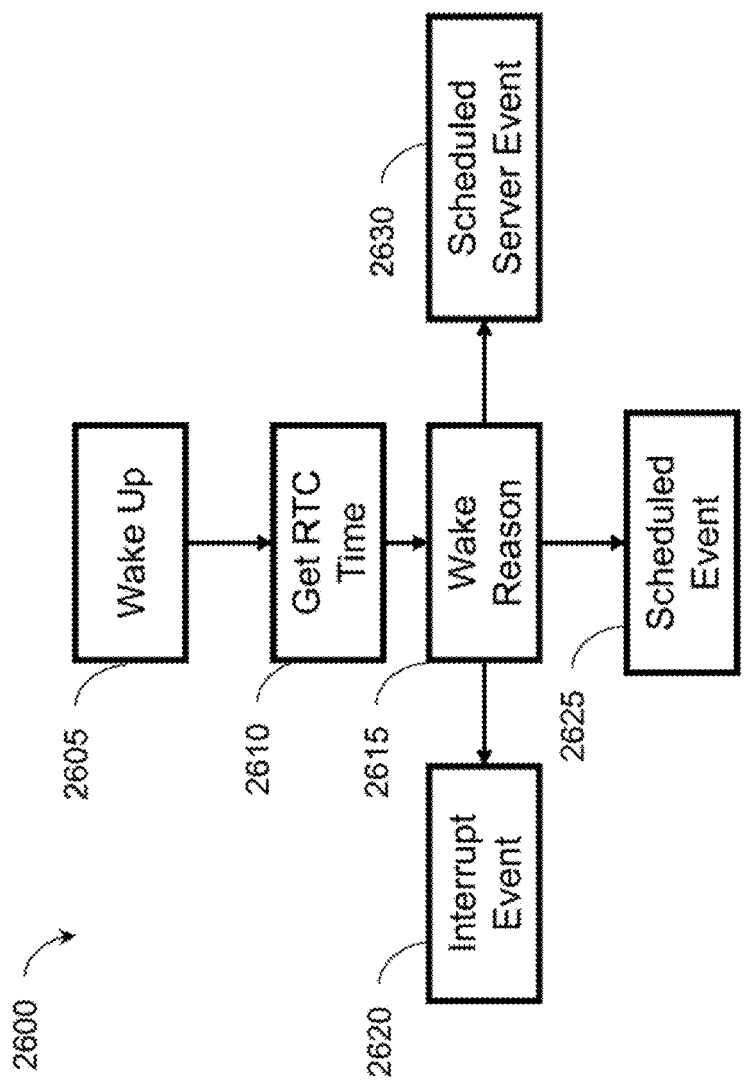
FIG. 20 is a flow diagram of a method of operating a waste management device, in accordance with an embodiment.

Referring to FIG. 20, a flowchart is shown demonstrating an embodiment of a method 2600 of operating a waste management device. The waste management device is has a wake up event at 2605. The waste management device gets the current time from the Real Time Clock (RTC) inside it's processor at 2610 and then checks whether the wake reason for if it's an interrupt event 2620, scheduled event at 2625, or scheduled server event at 2630.

Figure 21:
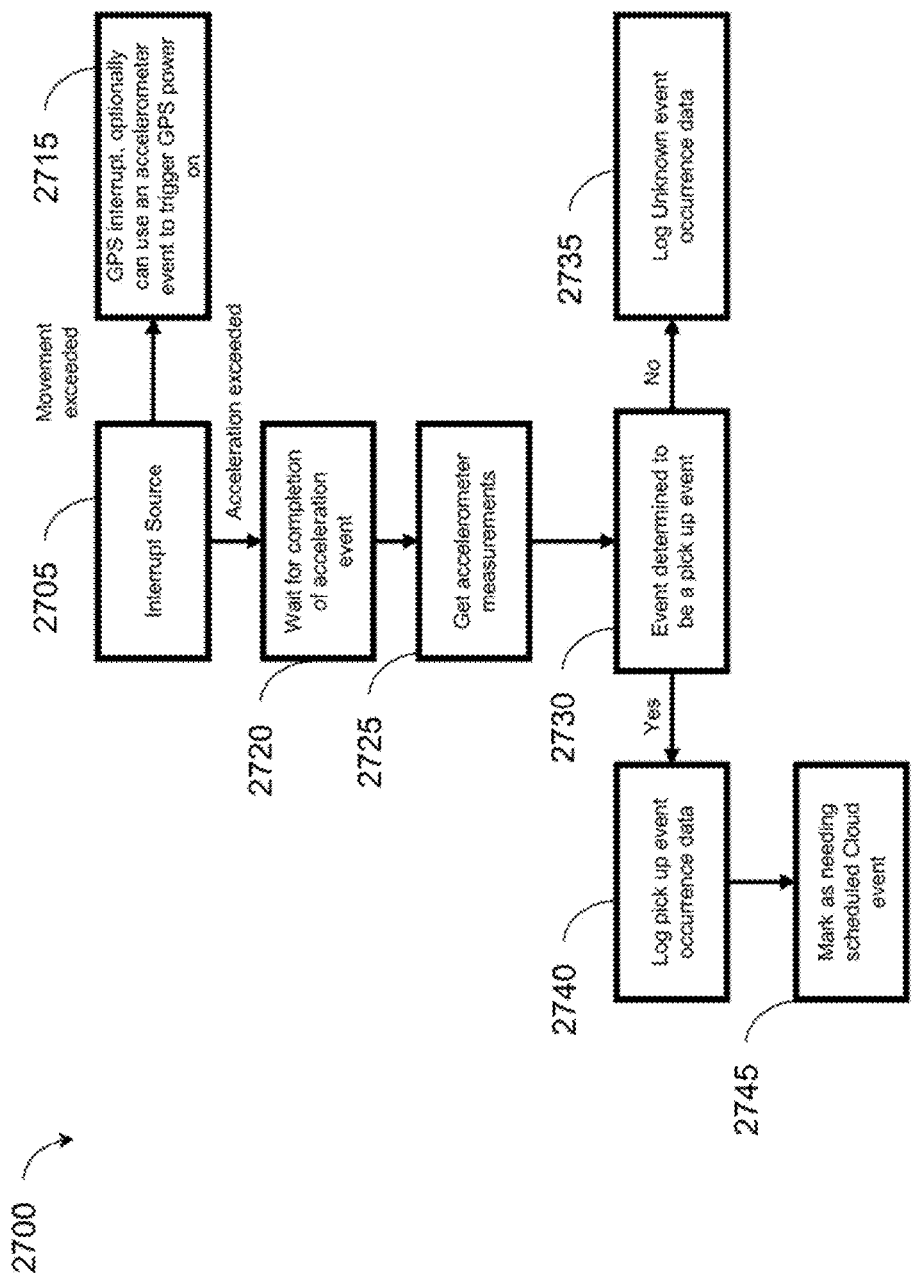
FIG. 21 is a flow diagram of a method of operating a waste management device if the wake up event is an interrupt event, in accordance with an embodiment.

Referring to FIG. 21, a flowchart is shown demonstrating an embodiment of a method 2700 of operating a waste management device if the wake up event is an interrupt event. If the event is an interrupt event, the interrupt source at 2705 is identified, if a movement limited was exceeded, or if an acceleration limit was exceed.

Temperature is checked as part of the fast scheduled wake up routine, the check can occur at a selectable time, optionally every 3 seconds. If a temperature limit is exceeded, an event is detected which will trigger a connection to the cell network.

If a movement limit is exceeded a GPS interrupt event is initiated to turn on the GPS sensor, optionally an accelerometer may be used to trigger the GPS power on at 2715. If an acceleration limit is exceeded, the device waits until the acceleration even is completed 2720, and then accelerometer measurements are retrieved at 2725.

The waste management device checks if the event is a pick up event at 2730 and if it is not then an unknown event is logged in the occurrence data at 2735. If the event is a pick up event, the pick up event is logged in the occurrence data at 2740 and marked as needing a scheduled cloud event at 2745.

Figure 22:
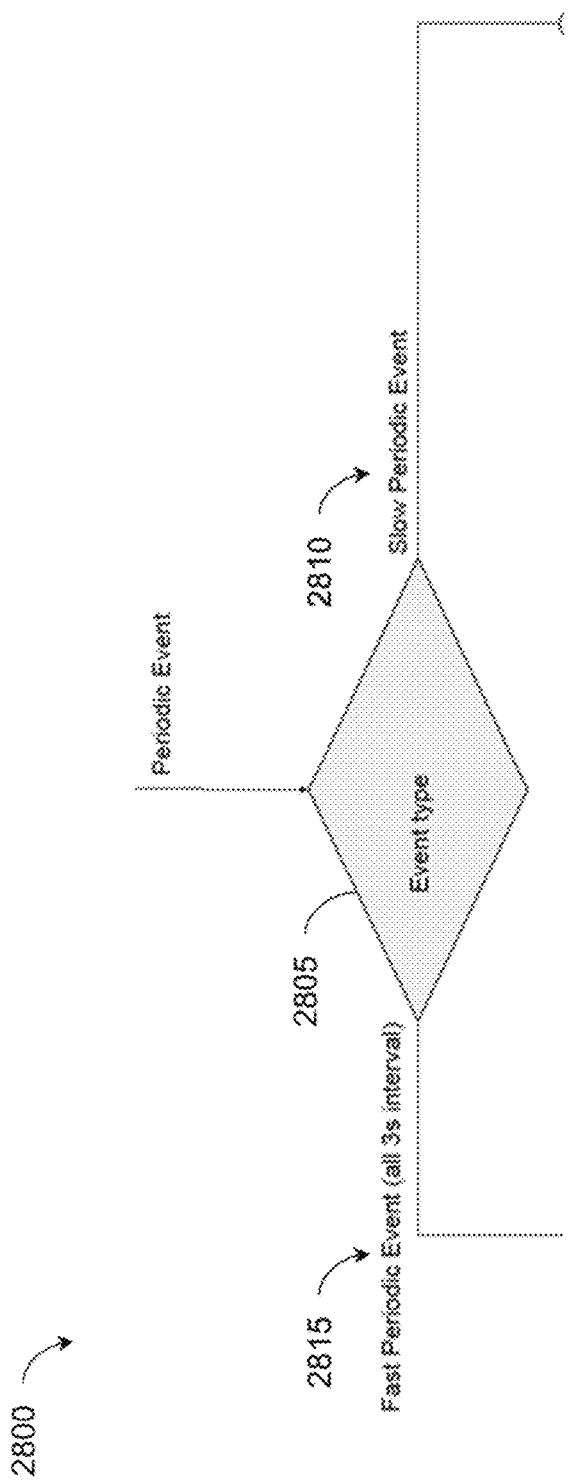
FIG. 22 is a flow diagram of a method of operating a waste management device if the wake up event is an periodic event, in accordance with an embodiment.

Referring to FIG. 22, a flowchart is shown demonstrating an embodiment of a method 2800 of operating a waste management device if the wake up event is an periodic event. The periodic event type is checked at 2805. The periodic event is either a fast periodic event at 2815 which occurs at 3 second intervals or a slow periodic event at 2810 which occurs at another interval.

Figure 23:
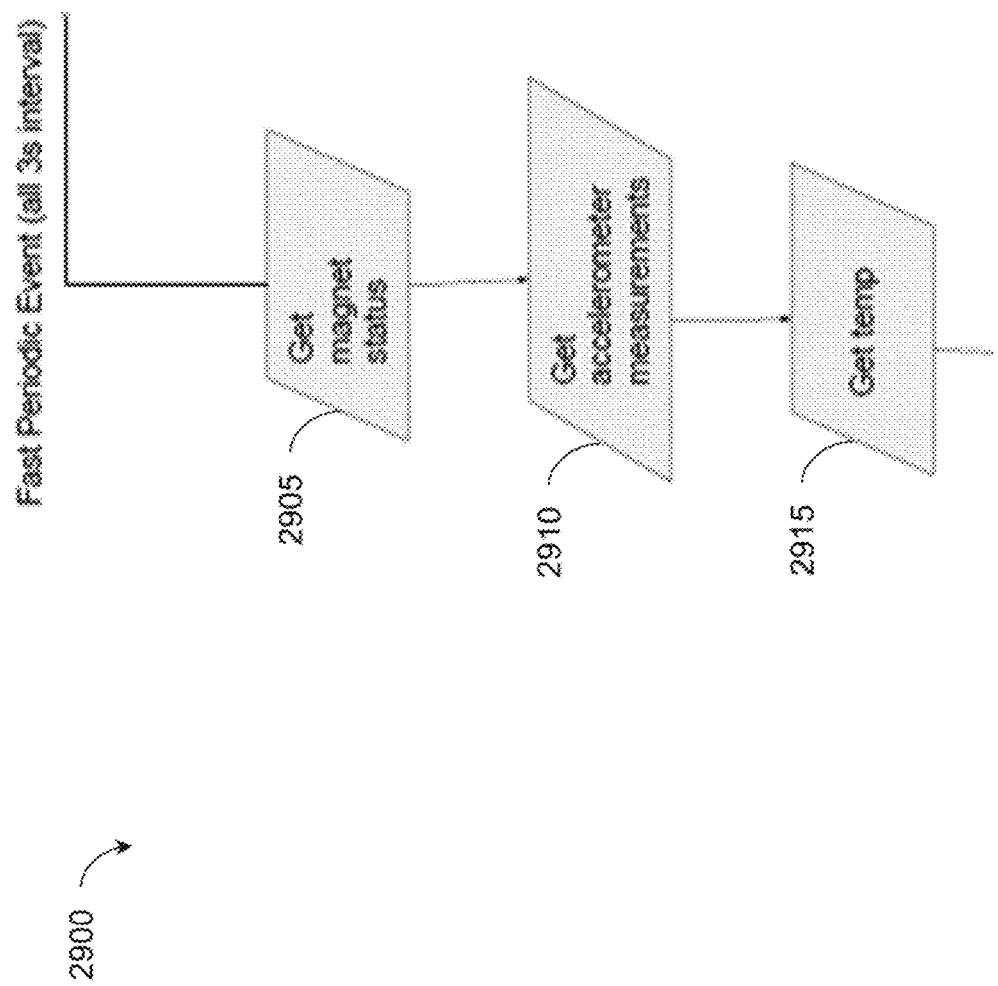
FIG. 23 is a flow of a method of operating a waste management device if the wake up event is a fast periodic event, in accordance with an embodiment.

Referring to FIG. 23, a flowchart is shown demonstrating an embodiment of a method 2900 of operating a waste management device if the wake up event is a fast periodic event. If the event is a fast periodic event, the device will retrieve the magnet status, at 2905, the accelerometer measurements, at 2910, and the temperature measurements, at 2915.

Figure 24:
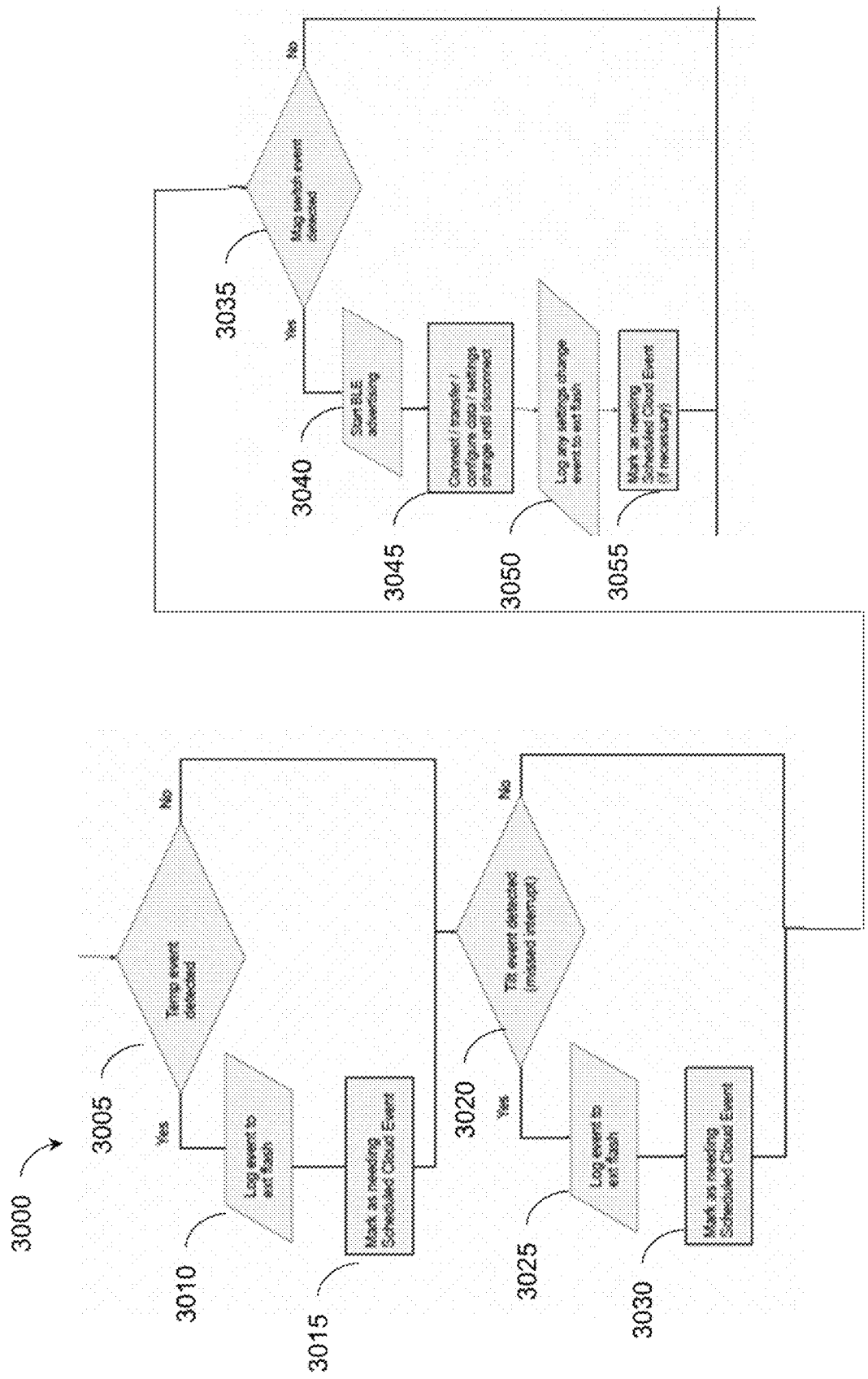
FIG. 24 is a flow diagram of a method of operating a waste management device if the wake up event is a fast periodic event following the method in FIG. 29.

Referring to FIG. 24, a flowchart is shown demonstrating an embodiment of a method 3000 of operating a waste management device if the wake up event is a fast periodic event following method 2900. The device checks if a temperature event is detected, at 3005. If a temperature event is detected, the event is logged to the device memory, at 3010 and the device marks a need for a scheduled cloud event, at 3015 and conducts the next step. If no event is detected, the device conducts the next step.

The device checks if a tilt event is detected, at 3020. If a tilt event is detected, the event is logged to the device memory, at 3025 and the device marks a need for a scheduled cloud event, at 3030 and conducts the next step. If no event is detected, the device conducts the next step.

The device checks if a mag switch event is detected, at 3035. If a mag switch event is detected, the Bluetooth Low Energy (BLE) advertising is initiated, at 3040. The device connects/transfers/configures data or settings until disconnected, at 3045. The event is logged to the device memory, at 3050 and the device marks a need for a scheduled cloud event, at 3055 and conducts the next step. If no event is detected, the device conducts the next step. BLE may also be referred to as Bluetooth Smart. During BLE advertisements, packets are broadcasted to receiving devices around the broadcasting device. The receiving device can then acts on the received information or connects to receive more information.

Figure 25:
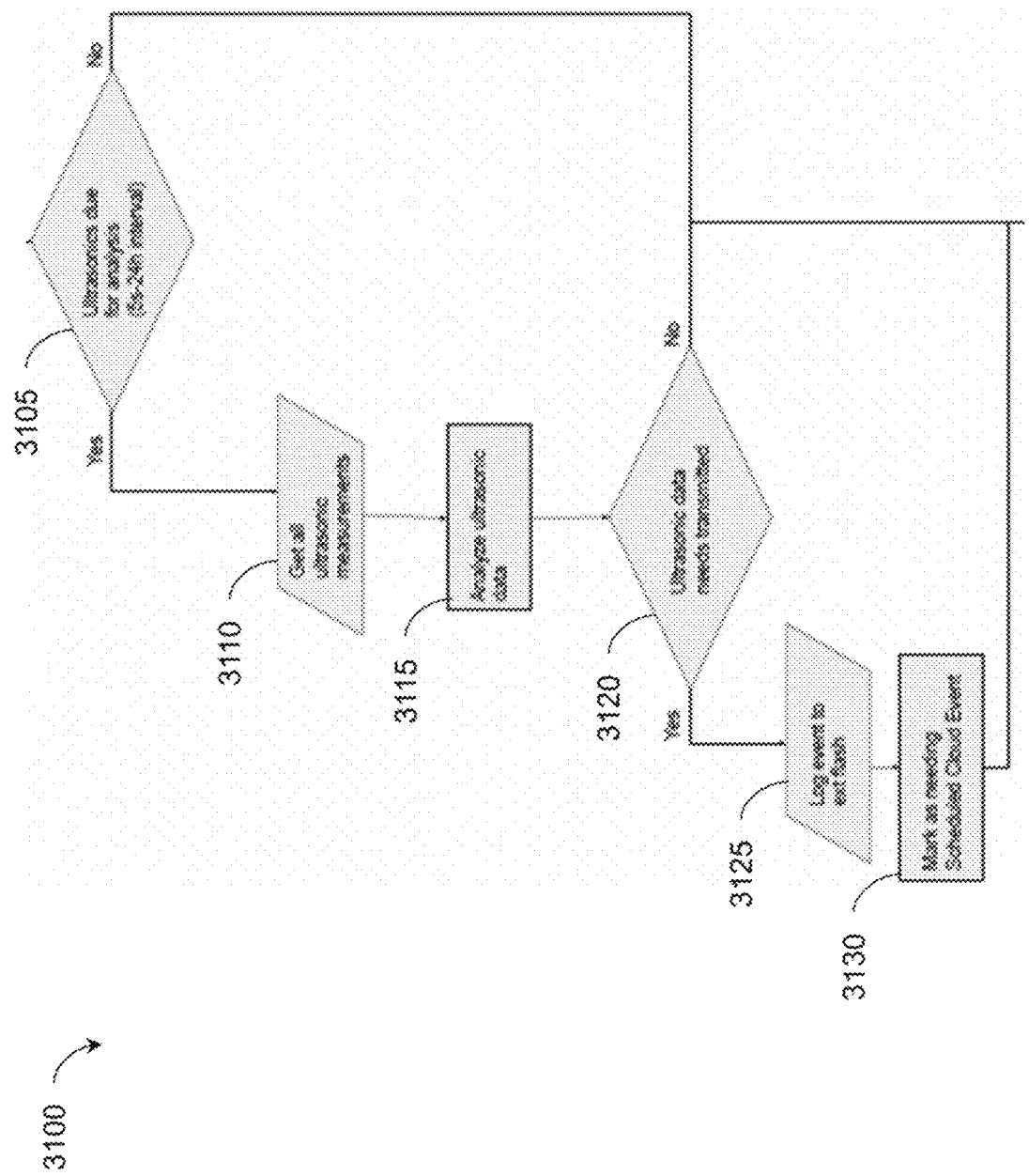
FIG. 25 is a flow diagram demonstrating an embodiment of a method of operating a waste management device if the wake up event is a slow period event following the method in FIG. 30.

Referring to FIG. 25, a flowchart is shown demonstrating an embodiment of a method 3100 of operating a waste management device if the wake up event is a slow period event following method 2800. The device checks if ultrasonic sensors are due for analysis, at 3105. The interval for checking can range between 5 seconds and 24 hours. If the sensors are due for analysis, all ultrasonic measurements are obtained, at 3110. All ultrasonic sensors are then analyzed, at 3115. The device determines if the sensory information of the ultrasonic sensors needs to be transmitted 3120. If it does, the event is logged to the device memory, at 3125 and the device marks a need for a scheduled cloud event, at 3130 and conducts the next step. If no event is detected, the device conducts the next step.

Figure 26:
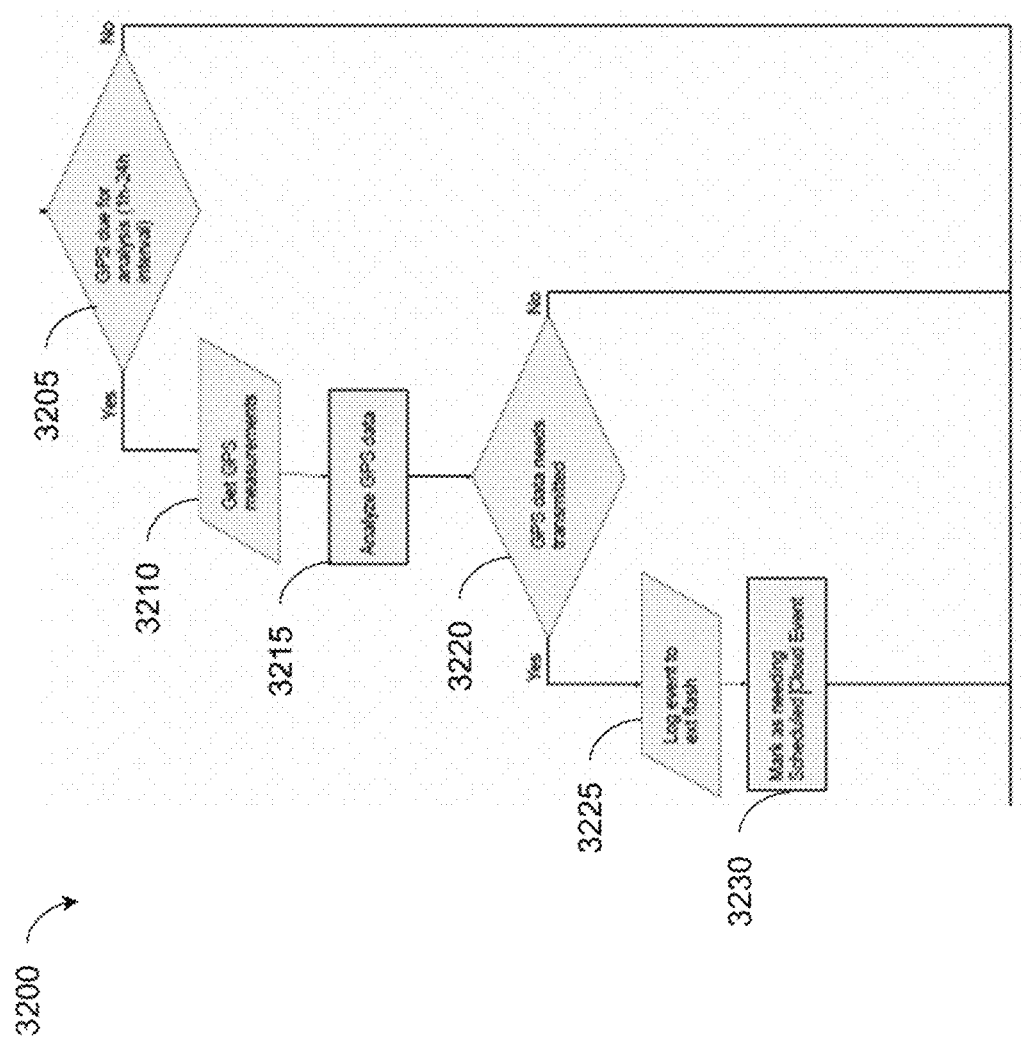
FIG. 26 is a flow diagram demonstrating of a method of operating a waste management device if the wake up event is a slow period event following the method in FIG. 31.

Referring to FIG. 26, a flowchart is shown demonstrating an embodiment of a method 3200 of operating a waste management device if the wake up event is a slow period event following method 3100.

The device checks if the GPS sensor is due for analysis, at 3205. The interval for checking can range between 1 hour and 24 hours. If the GPS sensor is due for analysis, GPS measurements are obtained, at 3210.

The sensory information from the GPS sensors is then analyzed, at 3215. The device determines if the sensory information of the GPS sensor needs to be transmitted, at 3220. If it does, the event is logged to the device memory, at 3225 and the device marks a need for a scheduled cloud event, at 3230 and conducts the next step. If no event is detected, the device conducts the next step.

Figure 27:
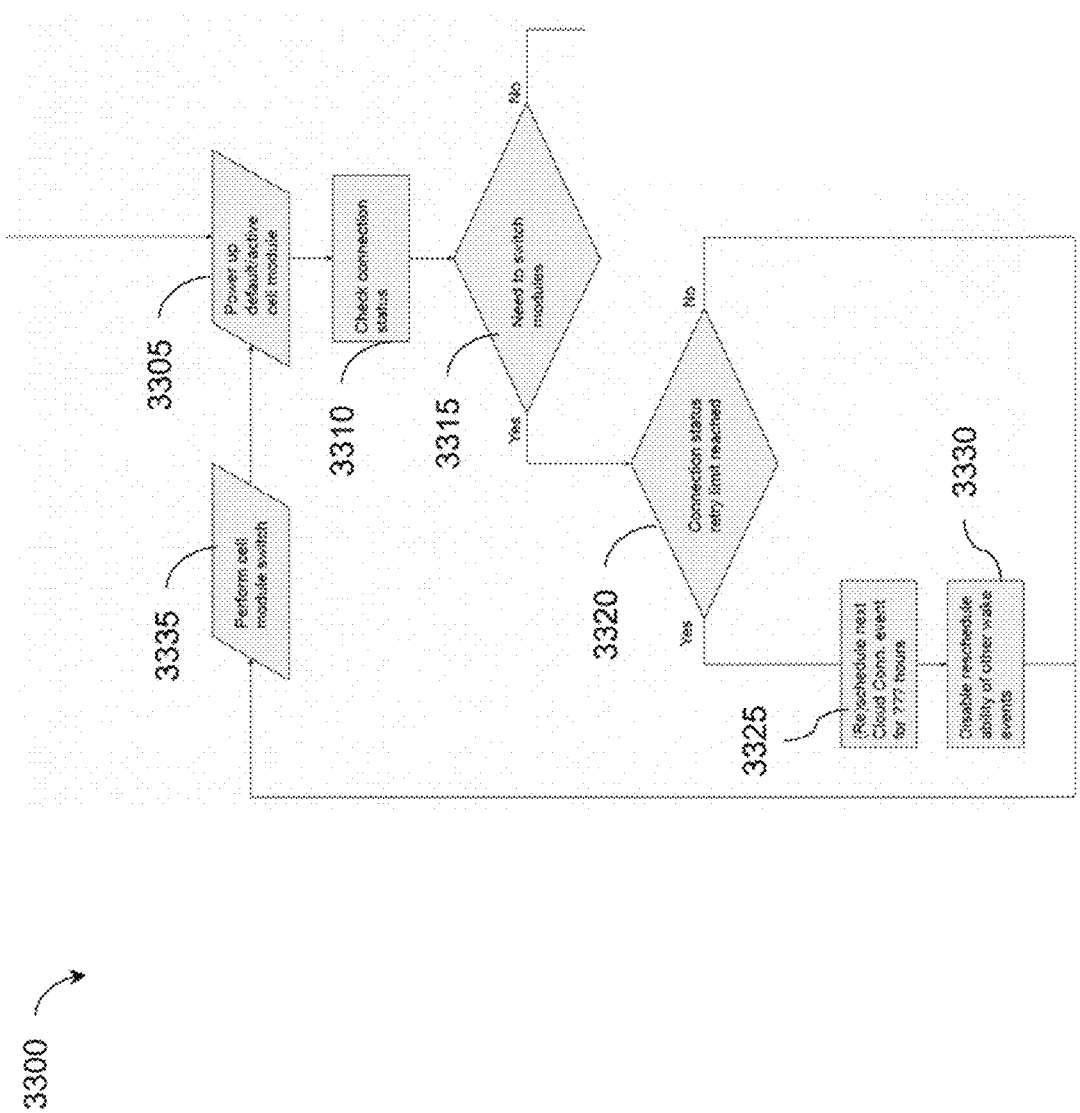
FIG. 27 is a flow diagram of a method of operating a waste management device if the wake up reason is a scheduled server event, in accordance with an embodiment.

Referring to FIG. 27, a flowchart is shown demonstrating an embodiment of a method 3300 of operating a waste management device if the wake up reason is a scheduled server event. The waste management device powers up the default or active cellular modem, at 3305.

The waste management device then checks the connection status of the cellular modem to the server, at 3310. The device determines whether there is a need to switch its cell modem, at 3315, such as if the device is not connected to the cellular network.

The device checks if the connection status retry limit has been reached, at 3320. If it has then the device reschedules the cloud connection event for a later time, at 3325 and disables reschedule ability for other wake events, at 3330. The device may then go to sleep.

If the connection status retry limit has not been reached the device performs a cell modem switch, at 3335 and restarts at 3305.

Figure 28:
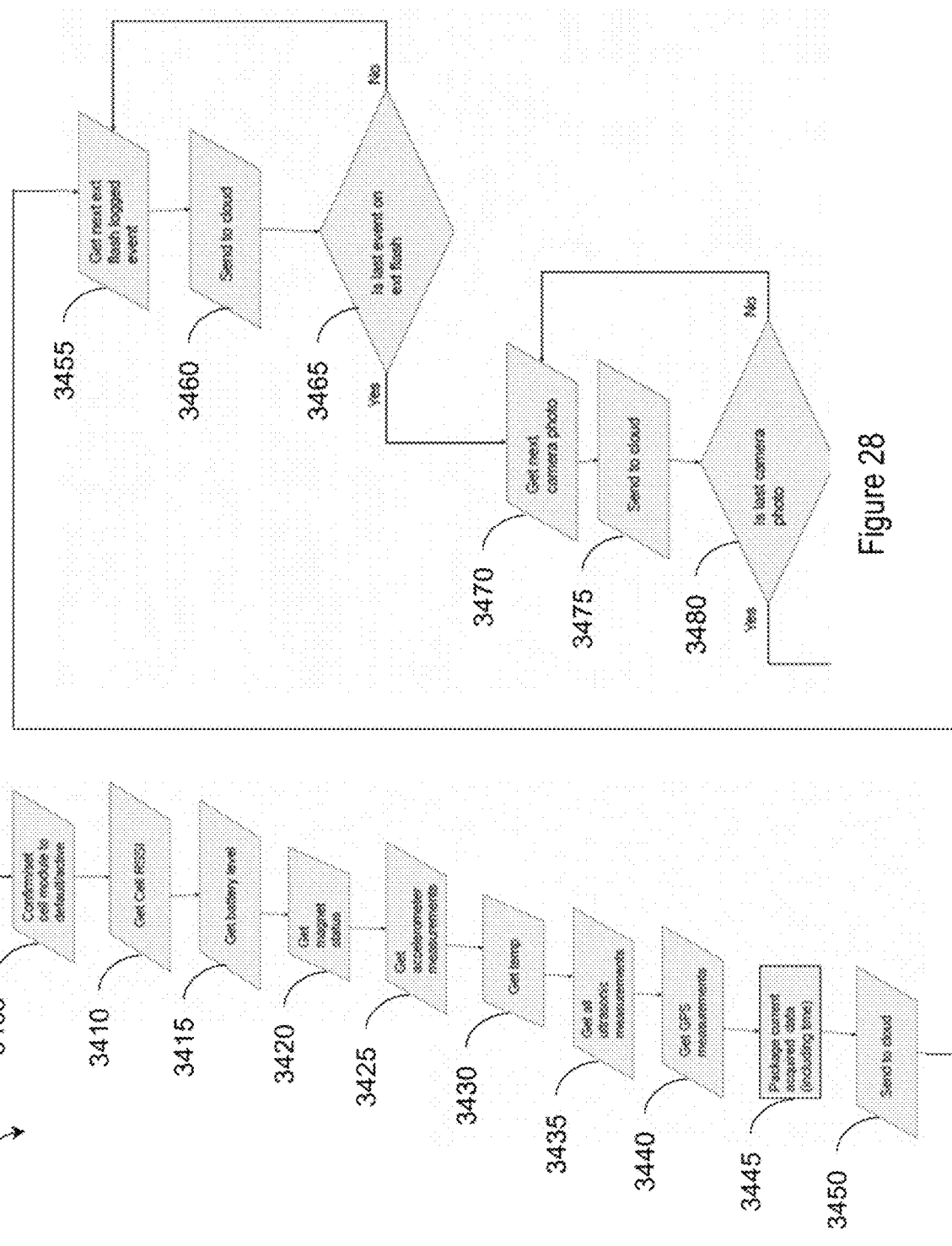
FIG. 28 is a flow diagram of a method of operating a waste management device if the wake up reason is a scheduled server event following the method in FIG. 33.

Referring to FIG. 28, a flowchart is shown demonstrating an embodiment of a method 3400 of operating a waste management device if the wake up reason is a scheduled server event following method 3300. If the waste management device does not need to switch the cellular modem, at 3315, the waste management device confirms or sets the cell modem to default or active, at 3405. The waste management device collects the cell RSSI, at 3410, the battery level, at 3415, the magnet status, at 3420, the accelerometer measurements, at 3425, the temperature measurements, at 3430, the ultrasonic sensor measurements, at 3435, and the GPS sensor measurements, at 3440.

The sensory information is packaged with current acquired data, at 3445, which includes the time and is sent to the cloud server, at 3450.

The waste management device collects the next logged event in device memory 3455 and sends the sensory information to the cloud server, at 3460. Steps 3455 and 3460 are repeated until all events are sent to the cloud server, at 3465.

The waste management device collects the next camera photo, at 3470 and sends the sensory information to the cloud server, at 3475. Steps 3470 and 3475 are repeated until all photos are sent to the cloud server 3480.

Figure 29:
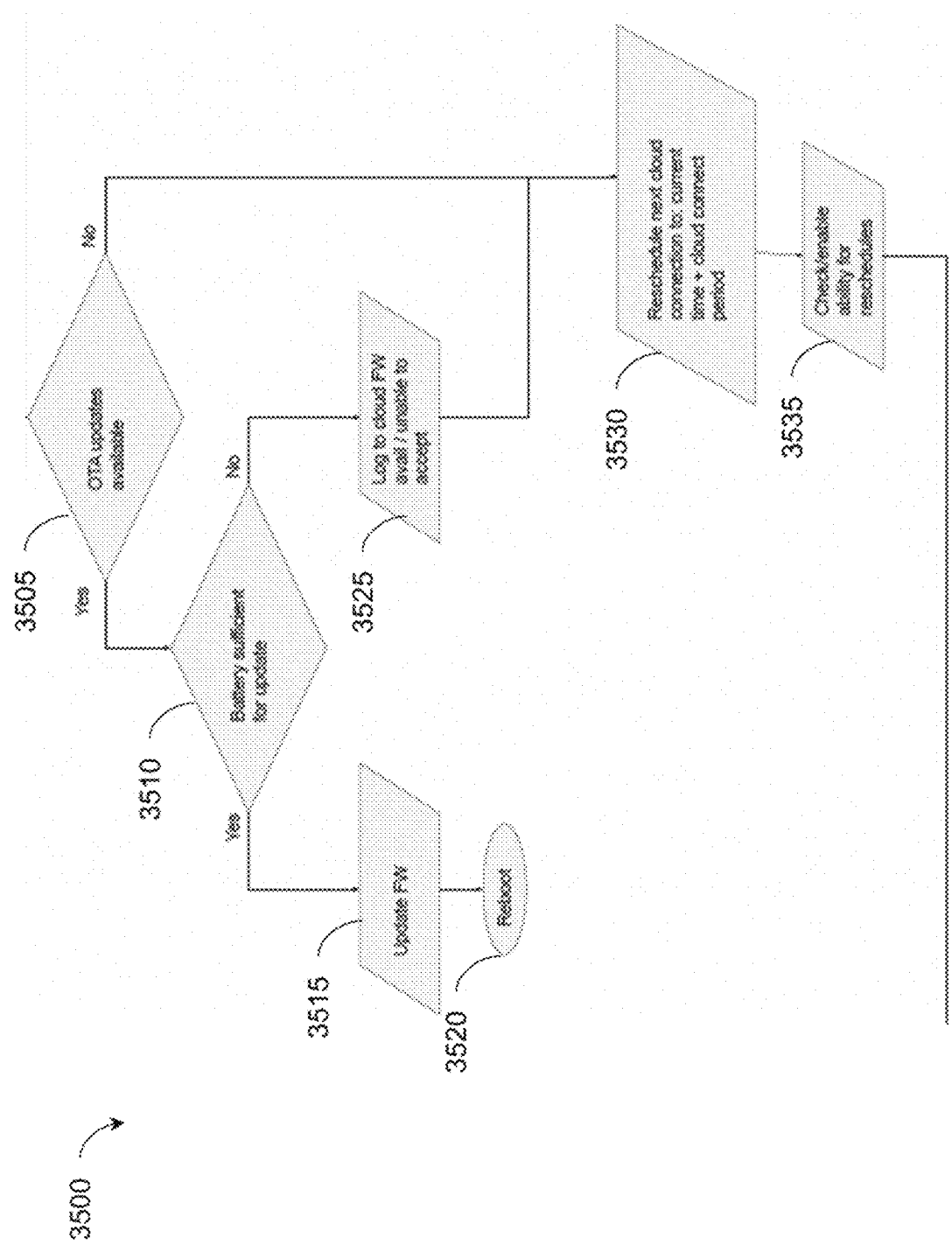
FIG. 29 is a flow diagram of a method of operating a waste management device if the wake up reason is a scheduled server event following the method in FIG. 34.

Referring to FIG. 29, a flowchart is shown demonstrating an embodiment of a method 3500 of operating a waste management device if the wake up reason is a scheduled server event following method 3400. If the all camera photos have been sent to the cloud server, at 3480, the waste management device checks if an OTA update is available, at 3505.

If no OTA update is available, the waste management device reschedules the next cloud server connection to a preset period after the current check, at 3530. The waste management device then checks and enables the ability for rescheduling, at 3535.

If an OTA is available the device checks if the batter level is sufficient to update the firmware, at 3510. If the battery level is sufficient, the waste management device 701 updates the firmware, at 3515, The waste management device 701 then conducts a reboot, at 3520.

If the battery level is not sufficient to update the firmware, the device submits a log to the cloud server that a OTA was available but was unable to accept, at 3525. The waste management device then reschedules the next cloud server connection to a preset period after the current check, at 3530. The waste management device then checks and enables the ability for rescheduling, at 3535.

Figure 30:
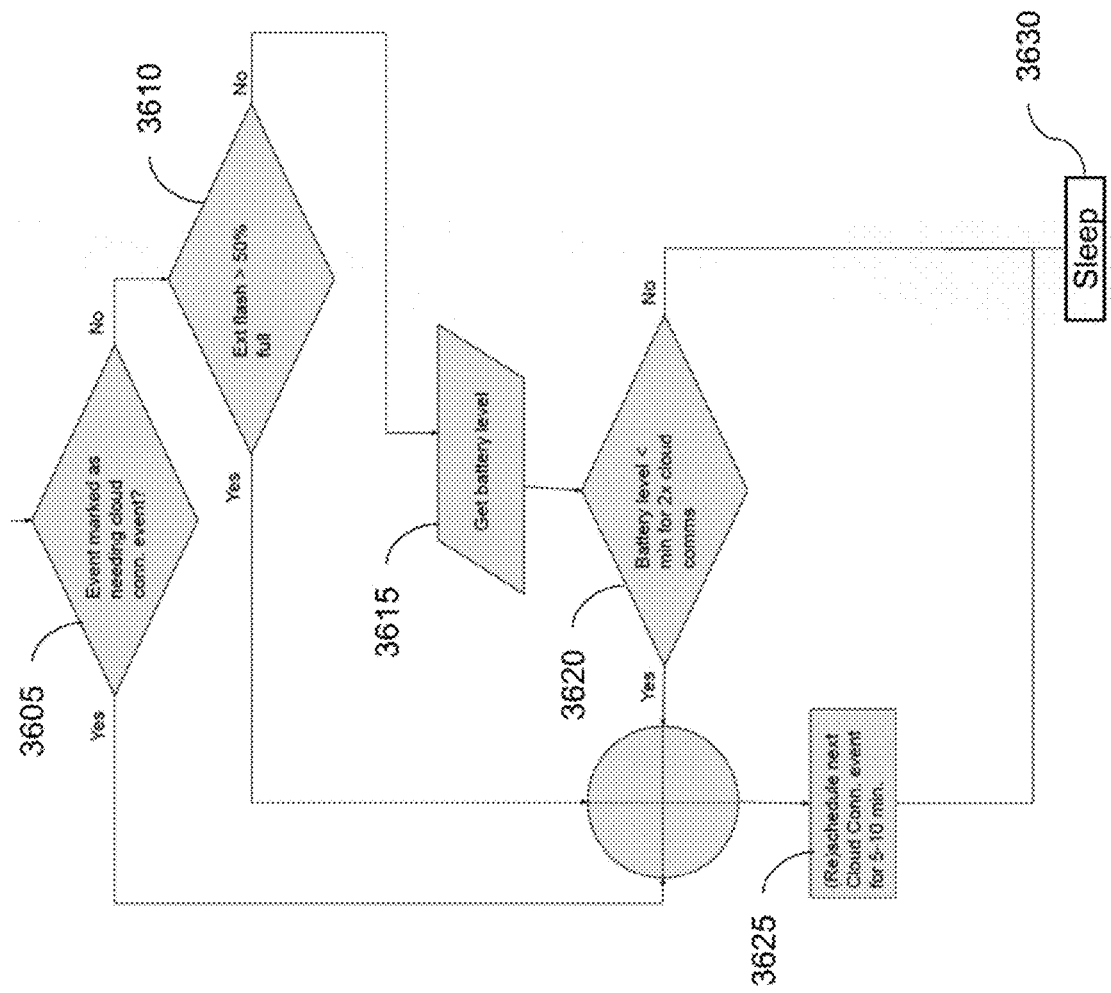
FIG. 30 is a flow diagram of a method of operating a waste management device following if the wake up event is a scheduled event or an interrupt event, in accordance with an embodiment.

Referring to FIG. 30, a flowchart is shown demonstrating an embodiment of a method 3600 of operating a waste management device following if the wake up event is a scheduled event, at 2625 or an interrupt event, at 2620.

The waste management device determines if the scheduled event 2620 or interrupt event 2620 is marked as needing a cloud connection event, at 3605. If the event is marked as needing a cloud event, the next cloud connection is rescheduled to be in 5-10 minutes, at 3625.

If the event is not marked as need a cloud connection event, the device memory is checked to determine if it is more than half full, at 3610. If it is more than half full, the next cloud connection is rescheduled to be in 5-10 minutes, at 3625.

If the device memory is half full or less, then the battery level of the waste management device is obtained, at 3615. If the battery level is less than minimum necessary for 2 cloud connections, at 3620, the next cloud connection is rescheduled to be in 5-10 minutes, at 3625.

If the battery level is not less than the minimum necessary for 2 cloud connections, at 3620, the waste management device will be put into sleep mode, at 3630.

Referring to FIG. 31A, a perspective front view of a waste management device 3700 is shown, according to an embodiment. The waste management device 3700 includes a plurality of sensors, the plurality of sensors include three ultrasonic sensors 3720, 3725, 3730. The plurality of sensors also includes a camera sensor 3735. The waste management device 3700 also includes ultrasonic actuators which, together with the ultrasonic sensors 3720, 3725, 3730 in a pulse-echo ranging measurement method using ultrasonic waves, are configured to measure the distance inside a waste bin and determine a fill level of the waste bin based on the distance measurement.

When attached to a waste bin, the housing 3710 allows for the waste management device to be attached to one of the sides of the waste bin. When attached, the waste management device 3700 is positioned such that the ultrasonic sensor 3730 is facing the bottom 3745 of the waste bin. The positioning of the ultrasonic sensor 3730 to face the bottom of the waste bin allows specific distance measurements to the bottom of the waste bin provide confirmation of whether the waste bin is empty. The positioning allows for confirmation of the distance to the bottom of the waste bin in the situation when the other two ultrasonic sensors 3720, 3725 do not detect a reading in their time of flight window and thereby are unable to distinguish between whether the waste bin is full or whether it is empty.

When the waste management device 3700 is attached to the waste bin, the positioning and configuration of the two ultrasonic sensors 3720, 3725 proximal to the top 3740 of the waste management device 3700 allow for measurements of the whole length and width of the interior of the waste bin. The ultrasonic sensors 3720, 3725 are able to collect distance measurements along the full breadth of the waste bin. A shorter distance measurement by the ultrasonic sensors 3720, 3725 indicate a greater waste bin fill level. The ultrasonic sensors 3720, 3725 are able to collect distance measurements and the processor of the waste management device or a server wirelessly connected to the waste management device is able to determine a waste bin fill level based on the distance measurements.

Figure 31B:
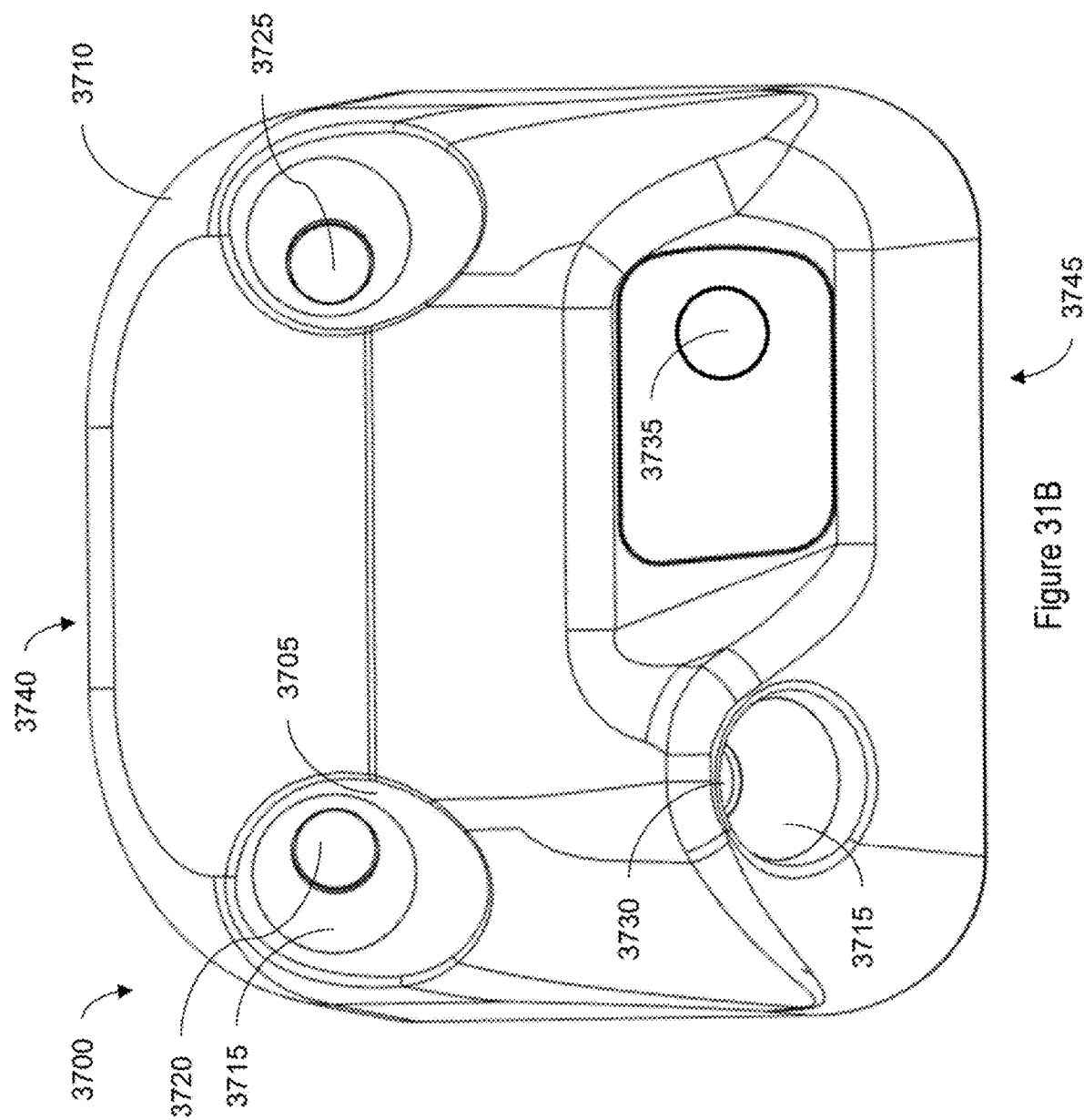
FIG. 31B is a perspective bottom view of the waste management device, in accordance with an embodiment.

Referring to FIG. 31B, a perspective bottom view is shown of the waste management device 3700, according to an embodiment. The waste management device 3700 includes a housing 3710 that encases the plurality of sensors. The housing 3710 includes cones 3715 which amplify the ultrasonic wave signal received by the ultrasonic sensor. The cones 3715 also focus the ultrasonic waves released by the ultrasonic actuator in the direction of interest. The cones 3715 are positioned in the housing directly in front of the each of the three ultrasonic sensors 3720, 3725, 3730. The cones 3715 are shaped such that the exiting ultrasonic wave from the ultrasonic actuator is directed in the direction the cone is facing. The cones 3715 thereby allow for obtaining distance measurements from desired angles of interest by directing the ultrasonic wave to be emitted in the direction of the angle of interest. The cones 3715 are present at each of the three ultrasonic sensors 3720, 3725, 3730.

It would be readily apparent that not all sensor types would require cones to be present in the housing to amplify the signal. For example, the camera sensor 3735, does not have a cone present in the housing in front of it. Further, the cones may be configured in any shape capable of directing ultrasonic waves in a desired direction.

The housing includes shroud extensions 3705 which improves the signal to noise ratio of the ultrasonic sensor by reducing the amount of reflected ultrasonic wave signals received by the ultrasonic sensor from angles that are not the angle of interest. The shroud extensions 3705 are positioned in the housing directly in front of the cones 3715. The shroud extensions 3705 are present in front of the cones 3715 of the two ultrasonic sensors 3720, 3725 on the front of the waste management device 3700. The shroud extensions 3705 on the two ultrasonic sensors 3720, 3725 reduces the amount of reflected ultrasonic waves detected by the ultrasonic sensors 3720, 3725 that are not from the angles of interest when collecting distance measurements along the breadth of the interior of the waste bin.

Figure 31C:
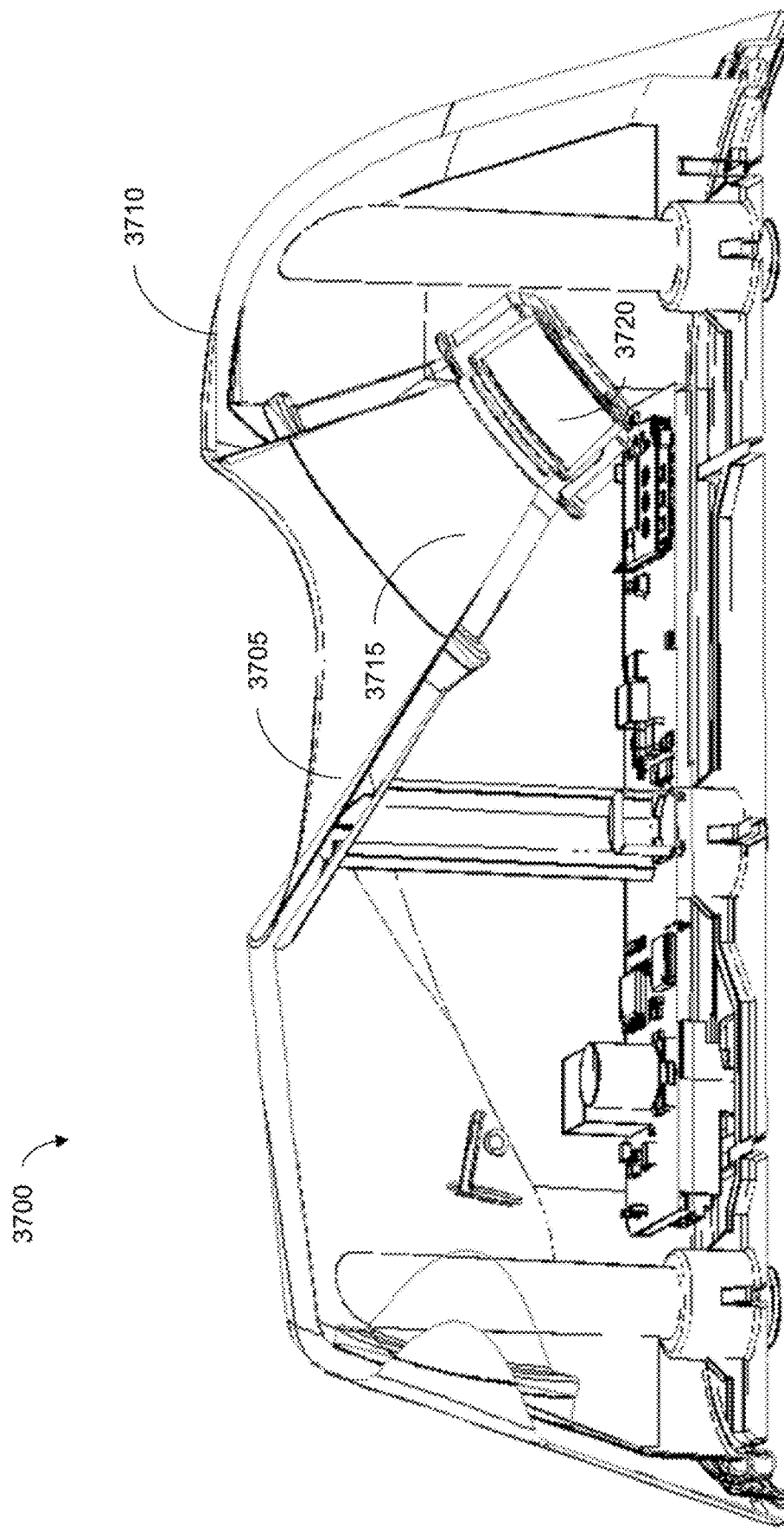
FIG. 31C is a cross-sectional view along the vertical plane of an ultrasonic sensor proximal to the top of a waste management device, in accordance with an embodiment.

Referring to FIG. 31C, a cross-sectional view is shown along the vertical plane of an ultrasonic sensor 3720 proximal to the top 3740 of a waste management device 3700, according to an embodiment. The ultrasonic sensor 3720 is directed downwards on a 45 degree angle such that measurements are taken from distances on a downward angle. The downward angle allows for measurements to be taken along the breadth of the waste bin while simultaneously providing an inverse correlation between distance measurement and the waste bin fill level. Ultrasonic sensor 3725 is also similarly directed downwards on a 45 degree downward angle.

While the ultrasonic sensor is shown on a 45 degree downward angle, any angle may be used if the angle allows for distance measurements along the length of the interior of the waste bin while providing for a determination of the waste bin fill level based on the measurements.

Figure 31D:
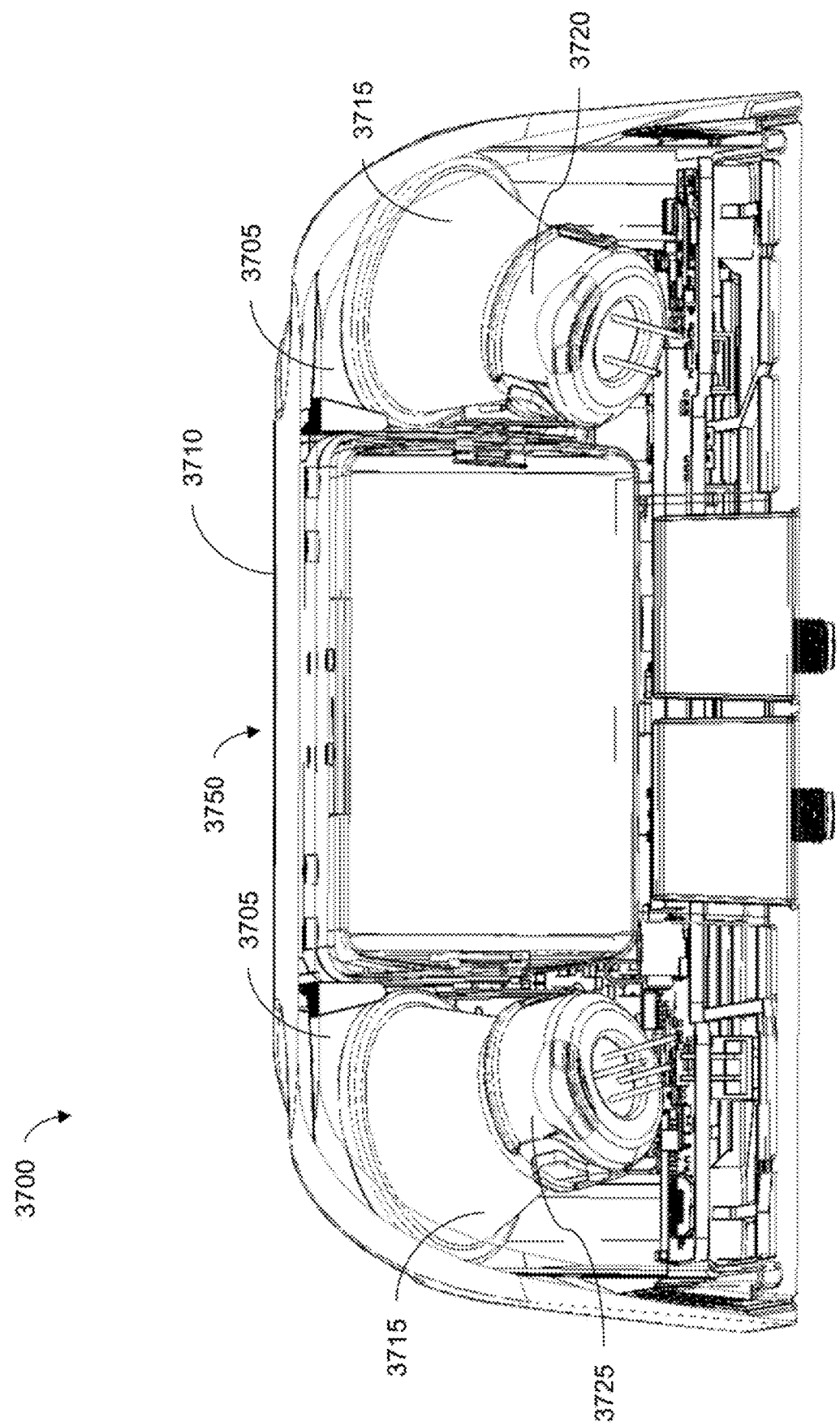
FIG. 31D is a cross-sectional view along the horizontal plane of the waste management device showing the two ultrasonic sensors proximal to the top of the waste management device, in accordance with an embodiment.

Referring to FIG. 31D, a cross-sectional view is shown along the horizontal plane of the waste management device showing the two ultrasonic sensors 3720, 3725 proximal to the top 3740 of the waste management device 3700. The ultrasonic sensors 3720, 3725 are directed outwards on a 20 degree outward angle from the center 3750 of the waste management device 3700. The outward angle allows each of the two ultrasonic sensors 3720, 3725 to obtain distance measurements from different sides of the waste bin.

While the ultrasonic sensors are shown on a 20 degree outward angle, any angle may be used if the angle allows for distance measurements at different points of the waste bin for determining a more comprehensive waste bin fill level.

The waste management device 701 is used with the waste management system 10 and methods 601 to provide for improved bin fill level detection and management. The waste management system 10 and methods 601 also provide for optimal route planning for waste collection.

The plurality of sensors 711 provides multi directional responses, software changeable directional responses, and response verification within that sensor type to improve indicative measure of the waste bin fill level being measured by the sensor. Therein the plurality of sensors provide the system with accurate, confirmed data on the fill level in the waste bin. This is critical information for optimization of waste management operations such as route planning.

The ability to reconfigure the plurality of sensors means improved signal to noise ratios and more consistent and accurate measurements which leads to better efficiencies in the operation of the waste management system and waste management methods because the presence of erroneous data is decreased.

The waste management system 10 and method 601 are provided with improved measurement accuracy and better tonal base material by the waste management device 701. For example, the waste management device allows for photos with objects to clearly be delineated for the machine learning and AI contamination detection algorithm of the waste management system and method. The sensory information allows for a higher rate of accurate detection.

Cross verification with the plurality of sensors 711 in the waste management device 701 by having at least two different types of sensors provides a large improvement on the operation of a measurement device by remotely confirming correct and accurate operation of the sensor type. The cross-verification provides a mechanism for the device sensor type to be remotely calibrated and provides parallel but different measurement technologies which also can significantly extend the time between service calls to the device as both sensor types would have to be impacted before service would be required.

The waste management device 701 provides the waste management system 10 and method 601 with accurate, cross confirmed data on the fill level in the waste bin as well as a mechanism to calibrate measurements and a way to maintain accurate measurements for a longer period of time. The accurate fill information and extended useful lifetime provide optimization of waste management operations.

The use of a multispectral camera 720 in the waste management device 700 provides the waste management system 10 with another method to cross confirm data on the fill level in the waste bin as well as a mechanism to provide operations improved, more consistent and accurate contamination determination which leads to better efficiencies throughout the operation.

The use of a protective lens 1505 configured to prevent occlusion of at least one sensor 1525 provides the waste management system 720 and method 601 with a way to maintain accurate measurements for a longer period of time. The protective lens 1505 decreases the cost of sending someone to the field to clean the sensor, and provides an extended useful lifetime of providing accurate useful data both of which provide optimization of waste management operations.

The wireless transmitter 721 of the waste management device 701 provides the waste management system 10 with reliable access to up to date data on an ongoing basis. The waste management system 10 uses current data from the plurality of sensors 711 on a consistent timely manner to maximize the efficiency of the operation. Missing data or late data are equally as damaging to the waste management operation as because it decreases the reliability of the sensory information as being current or accurate.

While the above description provides examples of one or more apparatus, methods, or systems, it will be appreciated that other apparatus, methods, or systems may be within the scope of the claims as interpreted by one of skill in the art.

The invention claimed is:

1. A waste management device comprising:
   a housing having at least one mounting point for attaching the waste management device to a waste bin;
   at least three sensors configured to sense contents of the waste bin, wherein the sensors include a camera sensor and an ultrasonic transducer,
   the ultrasonic transducer comprising:
      an ultrasonic actuator configured to emit ultrasonic waves; and
      an ultrasonic sensor configured to detect ultrasonic waves;
   the housing further comprising:
      a cone shaped to direct ultrasonic waves from the ultrasonic actuator in a direction of interest; and
      a shroud extension configured to reduce signal received by the ultrasonic sensor from angles not of interest;
      wherein the cone is arranged between the ultrasonic transducer and the shroud extension;
   a processor encased by the housing and electrically coupled to the sensors, the processor configured to:
      collect sensory information related to the contents of the waste bin from the sensors;
      determine a fill level of the waste bin based on the sensory information from the ultrasonic sensor;
      verify the fill level of the waste bin based on an image from the camera sensor;
      add an offset to the ultrasonic sensor, the offset based on the fill level as verified by the image from the camera sensor; and
   a wireless transmitter electrically coupled to the processor, wherein the wireless transmitter configured to send the sensory information to a server.

2. The waste management device of claim 1, wherein the processor is configured to determine the fill level of the waste bin based on the sensory information from at least two sensors of the same type.

3. The waste management device of claim 1, wherein the server is configured to determine the fill level of the waste bin based on the sensory information from at least two sensors of the same type.

4. The waste management device of claim 1 further comprising an accelerometer configured to detect the 3 dimensional tilt of at least one sensor.

5. The waste management device of claim 1, wherein the at least three sensors further comprise at least one of a temperature sensor, a time of flight sensor, a radar sensor, a lidar sensor, and a multispectral camera sensor.

6. The waste management device of claim 1, further comprising a temperature sensor disposed on an external surface of the housing to measure ambient temperature changes indicative of fire in the waste bin.

7. The waste management device of claim 1, wherein the at least three sensors comprises at least three or more sensors of the same type.

8. The waste management device of claim 1, wherein the wireless transmitter further comprises at least one of a cellular modem and a wifi modem.

9. The waste management device of claim 1, wherein the sensors are remotely reconfigurable for optimal signal return, the waste management device further comprising a controller configured to reconfigure the sensors based on an input from the server.

10. The waste management device of claim 1, wherein the sensors are configured to be oriented in different directions.

11. The waste management device of claim 10, wherein at least one sensor is configured to be oriented in a direction to confirm the distance to the bottom of the waste bin.

12. The waste management device of claim 1, wherein the housing further comprises a protective lens configured to prevent occlusion of at least one sensor.

13. The waste management device of claim 1, wherein the wireless transmitter is encased by the housing.

14. A method of managing waste comprising:
attaching a waste management device having plurality of sensors to a waste bin, the sensors including a camera sensor and an ultrasonic transducer, the ultrasonic transducer comprising:
an ultrasonic actuator configured to emit ultrasonic waves; and
an ultrasonic sensor configured to detect ultrasonic waves;
the waste management device further comprising:
a cone shaped to direct ultrasonic waves from the ultrasonic actuator in a direction of interest; and
a shroud extension configured to reduce signal received by the ultrasonic sensor from angles not of interest,
wherein the cone is arranged between the ultrasonic transducer and the shroud extension;
collecting sensory information from the plurality of sensors;
determining a fill level of the waste bin based on the sensory information from the ultrasonic sensor;
verifying the fill level of the waste bin based on an image from the camera sensor; and
adding an offset to the ultrasonic sensor, the offset based on the fill level as verified by the image from the camera sensor.

15. The method of managing waste of claim 14 further comprising collecting waste from the waste bin when the fill level is above a threshold fill level.

16. The method of managing waste of claim 14 further comprising determining the fill based on sensory information from at least two sensors of different types, wherein the fill level is determined after cross-validation with the at least two different types of sensors.

17. The method of managing waste of claim 14, wherein a distance measurement is derived from the sensory information to determine the fill level of the waste bin.

18. The method of managing waste of claim 14, wherein the sensory information of at least two sensors is used to improve the accuracy of the fill level of the waste bin.

* * * * *